(12) United States Patent       (10) Patent No.:     US 7,347,412 B1
Zhu                              (45) Date of Patent:    *Mar. 25, 2008

(54) MODULAR FENCE

(76) Inventor: Alan Qing-Lin Zhu, 8057 Indigo Ct., Alta Loma, CA (US) 91701

( * ) Notice: Subject to any disclaimer, the term of this patent is extended or adjusted under 35 U.S.C. 154(b) by 97 days.

This patent is subject to a terminal disclaimer.

(21) Appl. No.: 11/223,384

(22) Filed: Sep. 9, 2005

Related U.S. Application Data

(63) Continuation-in-part of application No. 10/659,104, filed on Sep. 9, 2003, now Pat. No. 7,025,335, which is a continuation-in-part of application No. 10/087,258, filed on Mar. 1, 2002, now Pat. No. 6,648,304.

(51) Int. Cl.
*E04H 17/14* (2006.01)

(52) U.S. Cl. ............... 256/22; 21/59; 21/65.01; 21/73; 403/252; 403/264; 403/329

(58) Field of Classification Search ........... 256/21, 256/22, 59, 65.01, 73; 403/252, 264, 326, 403/329
See application file for complete search history.

(56) References Cited

U.S. PATENT DOCUMENTS

| | | | | |
|---|---|---|---|---|
| 998,582 | A * | 7/1911 | Lucas | 403/329 |
| 1,312,485 | A * | 8/1919 | Krauth | 403/329 |
| 1,664,080 | A | 3/1928 | Mapson | |
| 2,779,561 | A * | 1/1957 | Blundeau | 403/108 |
| 3,067,985 | A | 12/1962 | Cusack | |
| 3,643,988 | A * | 2/1972 | Ingvartsen | 403/326 |
| 5,150,885 | A | 9/1992 | Leone | |
| 5,443,244 | A | 8/1995 | Gibbs | |
| 5,660,378 | A * | 8/1997 | Schall | 256/22 |
| 5,882,001 | A | 3/1999 | Reinbold | |
| 5,931,450 | A * | 8/1999 | Yoder | 256/66 |
| 6,053,481 | A | 4/2000 | Scheide | |
| 6,375,166 | B1 * | 4/2002 | Schall et al. | 256/21 |
| 7,021,607 | B1 * | 4/2006 | Alexander | 256/59 |
| 7,025,335 | B2 * | 4/2006 | Zhu | 256/22 |

FOREIGN PATENT DOCUMENTS

JP         08170451 A  *  7/1996

* cited by examiner

*Primary Examiner*—Daniel P. Stodola
*Assistant Examiner*—Ernesto Garcia
(74) *Attorney, Agent, or Firm*—Thomas I. Rozsa

(57) ABSTRACT

A modular picket fence including a pair of vertical posts positioned at suitable distance and adapted to be secured to a suitable support surface. A pair of horizontal upper and lower rails extend between and secured to the vertical posts. The upper rail has a plurality of apertures which are aligned with a plurality of apertures on the lower rail. The apertures can be of any given shape including square, narrow rectangular, wide rectangular, oval, round, narrow polygonal and wide polygonal. A plurality of vertical pickets having a cross-sectional shape corresponding to the shape of the apertures in the horizontal rails are respectively inserted through into aligned apertures of the upper and lower rails. The end portion of each vertical picket has two transverse apertures.

28 Claims, 24 Drawing Sheets

MODULAR FENCE

This Patent application is a continuation in-part of patent application Ser. No. 10/659,104 filed on Sep. 9, 2003 now U.S. Pat. No. 7,025,335 which is a continuation-in-part of patent application Ser. No. 10/087,258 filed on Mar. 1, 2002, which issued as U.S. Pat. No. 6,648,304 B1 on Nov. 18, 2003.

BACKGROUND OF THE INVENTION

1. Field of the Invention

The present invention relates generally to the field of fences. More particularly, the present invention relates to the field of modular picket fences.

2. Description of the Prior Art

Specifically, prior art wrought iron fences are well known in the art. These prior art; wrought iron fences have become especially popular in recent years as protective fencing around swimming pools, gardens and serve as security barriers around patios and entryways. The wrought iron fences are formed from rods or tubes of metal which are welded to upper and lower rails to form panels or sections. The panels are either welded between upright metal posts or bolted to the upright posts. The iron fences are sturdy but have a number of problems such as the welded areas are susceptible to rusting even when painted and if galvanized components are used the welding destroys the coating at the welded area that leads to rust. The wrought iron fences are usually assembled and joined together at the job site and required considerable skill and time on the part of the professional artisans. For this reason, they are relatively expensive.

The following six (6) prior art patents are found to be pertinent to the field of the present invention:

1. U.S. Pat. No. 1,664,080 issued to Mapson on May 6, 1926 for "Ornamental Iron Stair Rail Structure" (hereafter "Mapson");
2. U.S. Pat. No. 3,067,985 issued to Cusack on Mar. 8129, 1961 for "Picket Fence" (hereafter "Cusack");
3. U.S. Pat. No. 5,150,885 issued to Leone on Sep. 29, 1992 for "Picket Fence Assembly" (hereafter "Leone");
4. U.S. Pat. No. 5,443,244 issued to Gibbs on Aug. 22, 1995 for "Rolled Metal Pence Rail" (hereafter "Gibbs");
5. U.S. Pat. No. 5,882,001 issued to Reinbold on Mar. 16, 1999 for "Modular Fence Structure" (hereafter "Reinbold"); and
6. U.S. Pat. No. 6,053,481 issued to Scheide on Apr. 25, 2000 for "Security Fence Rail Bracket" (hereafter "Scheide").

Mapson discloses an ornamental iron stair rail structure with means of securing the separate members of the side railing of stairs together.

Cusack discloses a modular picket fence having horizontal rails and vertical pickets interconnected by a plurality of bolt and nut sets. However, each bolts and nuts set (40, 42 and 44) must be separately and individually fastened, which is very laborious and time consuming.

Leone discloses a picket fence assembly which comprises an upper rail, a lower rail and a plurality of vertically disposed pickets. Each rail has a plurality of non-circular apertures that extend therethrough in substantial vertical alignment. Each picket extends through one of the apertures in the upper rail and through one of the aligned apertures in the lower rail. The pickets have upper and lower indentations for engaging the upper and lower rails. The pickets are respectively held in the apertures and are axially movable in the apertures to a locking position at which the indentations in the pickets are engaged by the rails and axial movement of the pickets relative to the rails is prevented. The rails are provided with a frictional locking means, such that the pickets are engaged in a frictional fit therewith in the locking position wherein rotational movement of the pickets is restrained. The frictional locking means comprises a plurality of paired opposed indentations in the flanges of the rails. The indentations conform with the perimeter configuration of the pickets in the locking position.

Gibbs discloses a rolled metal rail that is incorporated into a picket fence which utilizes multiple such rails.

Reinbold discloses a modular fence structure which includes a plurality of posts having vertically spaced ribs on confronting surfaces for supporting the respective end portion of inverted U-shaped rails. The rails have a plurality of longitudinally equally spaced vertically aligned apertures with each aperture having a tab portion of the U-shaped rail bight portion projecting into the aperture. A plurality of pickets are cooperatively received by the respective aligned apertures with each picket having a pair of transverse longitudinally spaced slots in its wall cooperatively nesting a respective tab projecting into each slot. An inverted L-shaped spring clip enters the respective aperture on that side of the post opposite its slot to engage upper and lower surfaces of the bight portion of the respective rail adjacent the aperture and lock the respective picket against movement relative to the rails.

Scheide discloses a security fence rail bracket for supporting a fence rail which includes a hollow body with an open-topped cavity and an end wall with a cross-shaped aperture through which a bolt is passed into a fence post. The angularity of the body with respect to the post surface is adjusted by installing one or more tapered spacers between the body and the post. The spacers have nesting bosses and recesses, and offset slots through which the bolt passes.

It is desirable to provide a modular picket fence which may be formed from metal or other materials and easily and conveniently assembled on the job site by a professional or homeowner. It is also desirable to provide a modular picket fence which includes separate interconnecting modular parts that can be assembled together without any welding or using special tools or equipment, thereby reducing costs and lowing assembled labor.

SUMMARY OF THE INVENTION

The present invention is a unique modular picket fence.

The modular picket fence comprises a pair of vertical posts positioned at suitable distance and adapted to be secured to a suitable support surface. At least one horizontal upper and lower rails extend between and secured to the vertical posts. The horizontal upper rail has a plurality of vertical apertures which are substantially aligned with a plurality of vertical apertures on the horizontal lower rail. A plurality of vertical pickets are respectively inserted through the vertical apertures of the upper rail and through aligned vertical apertures of the lower rail. Each picket has at least two transverse locking slotted apertures for respectively receiving a H-shaped locking clip to secure the picket to the rail.

It is an object of the present invention to provide a modular picket fence which has a decorative and functional enclosure for any physical area formed from modular components permitting a complete customized fencing section which may be erected at the installation site, preferably from prefabricated metallic material.

It is an additional object of the present invention to provide a modular picket fence in the form that may be readily assembled from a set of modular components by a person or homeowner of ordinary skill and experience without the use of welding equipment or other special tools.

It is a further object of the present invention to provide a modular picket fence which the manufactured components are reduced to a small number of very simple and inexpensive components.

It is a further object of the present invention to provide a modular picket fence which includes an insertable locking means that engages the picket and rail for precluding vertical movement of the pickets with respect to the rails.

It is an additional object of the present invention to provide a modular fence having a multiplicity of different cross-sections for the fence post including square, narrow rectangular, wide rectangular, round, oval and polygonal.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a modular picket fence. In the first arrangement of the present invention, the modular picket fence may be assembled with a pair of horizontal upper rails and one horizontal lower rail as shown in FIGS. 1, 2, 6(f), and 6(g). In the second arrangement of the present invention, the modular picket fence may be assembled with at least one horizontal upper rail and at least one horizontal lower rail as shown in FIGS. 6(a)-6(e).

Figure 1:
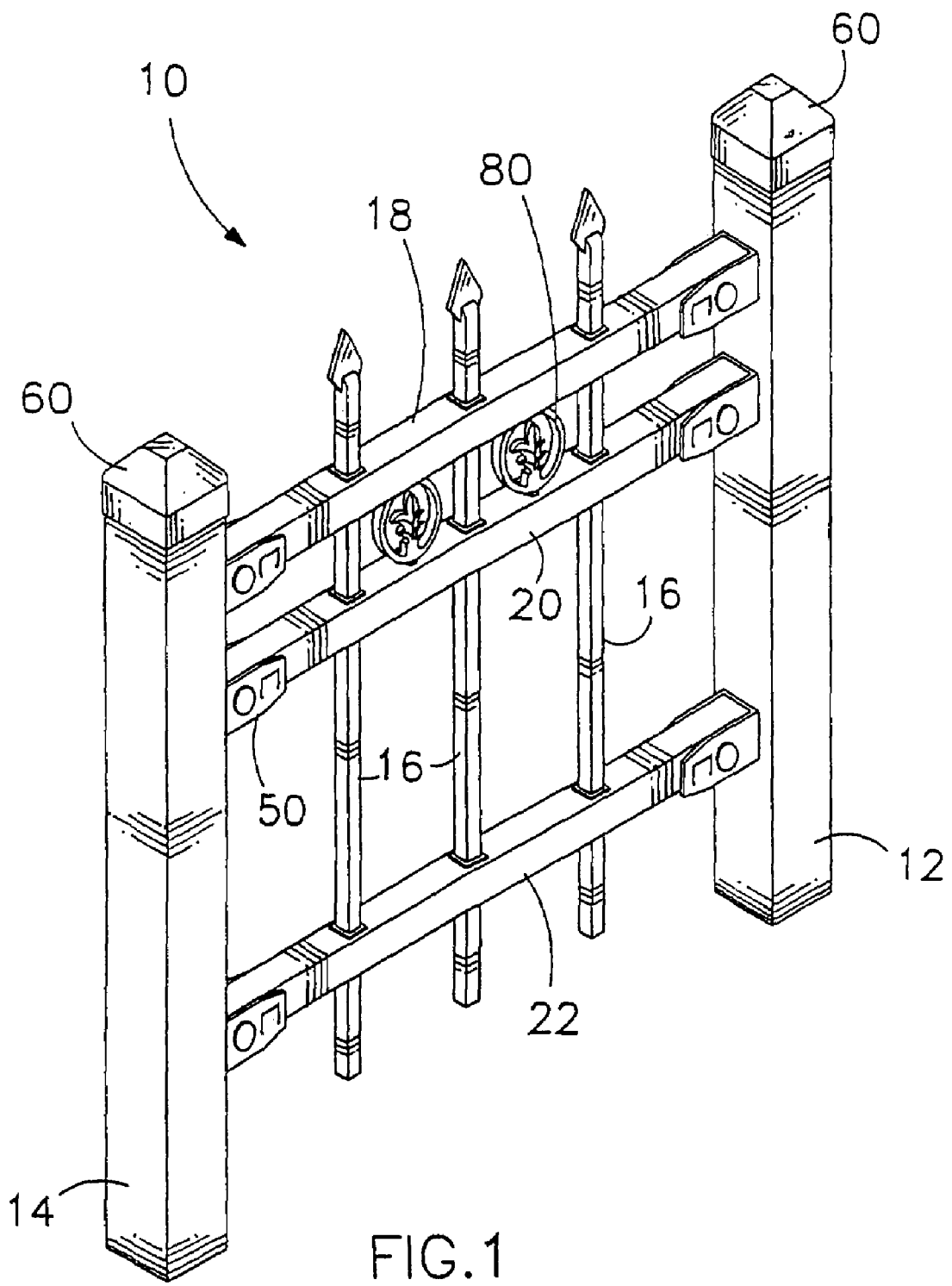
FIG. 1 is a perspective view of the preferred embodiment of a fully assembled modular picket fence in accordance with the present invention.

Referring to FIG. 1, there is shown at 10 a first arrangement of the present invention modular picket fence which comprises a pair of hollow vertical posts or columns and 14 usually spaced apart approximately 6-8 feet and positioned to be secured to a support surface or any other suitable surface, a plurality of hollow vertically disposed pickets or poles 16, a pair of spaced apart elongated hollow horizontal upper rails 18 and 20, and an elongated hollow horizontal lower rail 22. In the example shown, the posts 12 and are square shaped tubular but obviously may be of other cross-sectional configuration as desired.

For clarity purposes, only three vertical pickets 16 are illustrated. It will be appreciated that the vertical pickets 16 are not limited to the number of pickets illustrated in FIG. 1. It is emphasized that while the three vertical pickets are depicted, it is also within the spirit and scope of the present invention to have a plurality of vertical pickets which can be used as shown in FIGS. 6(b)-6(g). It will also be appreciated that at least one elongated horizontal upper rail 18 and at least one elongated horizontal lower rail 22 can be used with the present invention modular fence assembly as shown in FIGS. 6(a)-6(e).

Figure 2:
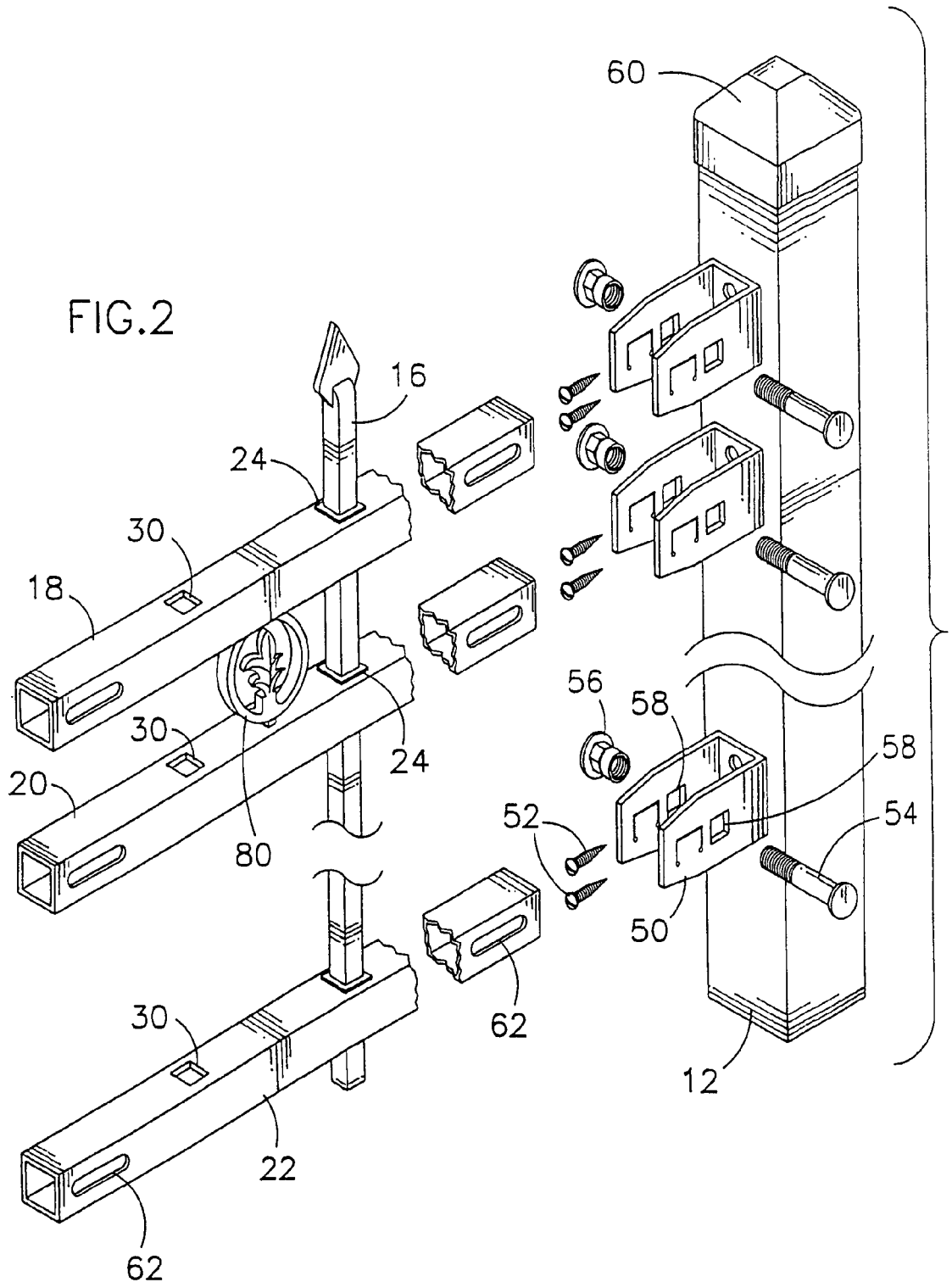
FIG. 2 is an enlarged exploded perspective view of the present invention modular picket fence shown in FIG. 1.

Referring to FIGS. 1 and 2, each of the vertical posts 12 and 14 are substantially identical, and to the extent they are, only one will be described in detail in the interest of brevity. At least three U-shaped metal brackets 50 are attached to the post 12 and located at three different locations along the length of the post 12, where the brackets 50 of each post face each other as shown in FIG. 1. Each bracket 50 is held against the inner wall or surface of the post 12 by at least two screws fasteners 52 which are threadedly engaged to the bracket 50 and the post 12. As depicted in FIG. 2, the ends of the rails 18, 20 and 22 are removably attached between the posts 12 and 14 by the U-shaped metal brackets 50, which receive and retain the rails thereto by using bolts 54 and nuts 56. Each bolt 54 is inserted through the hole 58 on one side of the bracket 50 and then inserted through a slotted adjustment aperture 62 of the rail for allowing a horizontal adjustment of the rails. An ornamental cover or cap 60 is inserted in the upper end of the vertical post 12 for decorative and sealing purposes.

Each of the horizontal rails 18, 20 and 22 are substantially identical, and to the extend they are, only one will be described in detail in the interest of brevity. It will be appreciated that the horizontal rail can be of any desired cross-sectional shape. Therefore, while a horizontal rail 118 having a generally square shape has been illustrated, any cross-section of horizontal rail can be used with the present invention. The rail 18 has a plurality of longitudinally equally spaced apart vertically aligned non-circular apertures 30, preferably four-sided apertures for receiving the plurality of non-circular pickets 16, preferably four-sided pickets. The non-circular apertures 30 are being of shape and size equal to the cross sectional shape and size of the pickets 16 such that the pickets 16 may be inserted therethrough. The rail 18 also has two slotted apertures 62 extending through the side of rail and located at opposite ends.

Figure 5A:
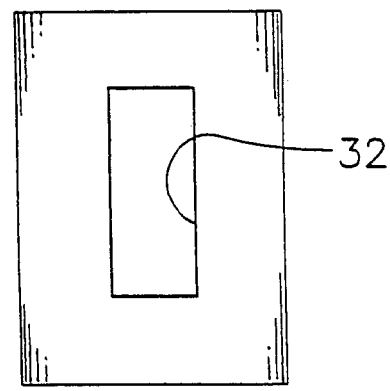
FIG. 5(a) is a plan view of a preferred embodiment of a locking slotted aperture in accordance with the present invention.

As shown in FIGS. 1 and 2, there are provided ornamental caps 24 for each aperture 30 on the rails 18, 20 and 22, and which is slidable on the picket 16 to position the ornamental cap 24 for covering and sealing the aperture 30 when the pickets 16 are in a locking position. The pickets 16 have a uniform square cross-section and have at least one transverse upper locking slotted aperture 32 and at least one transverse lower locking slotted aperture 34 extending therethrough (see FIG. 3) and located along the length of the picket and cooperating with the rails 18 and 22 for precluding movement of the pickets 16 with respect to the rails 18, 20 and 22. The upper and lower locking slotted apertures 32 and 34 are generally rectangular shape as shown in FIG. 5(a). Each picket 16 is held in position by at least two H-shaped locking clips or means 40 (see FIG. 3).

Figure 5B:
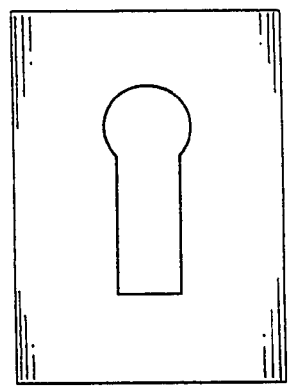
FIG. 5(b) is a plan view of an alternative embodiment of a locking slotted aperture in accordance with the present invention.
Figure 5C:
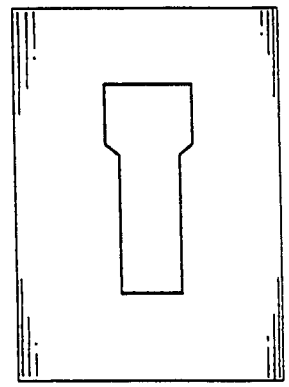
FIG. 5(c) is a plan view of still another alternative embodiment of a locking slotted aperture in accordance with the present invention.

It will be appreciated that the upper and lower locking slotted apertures 32 and 34 are not limited to the rectangular shape illustrated in FIG. 5(a). It is emphasized that while the rectangular shape of the locking slotted aperture is preferred, it is also within the spirit and scope of the present invention to have a plurality of different shapes for the locking slotted apertures as shown in FIGS. 5(b) and 5(c).

Figure 3:
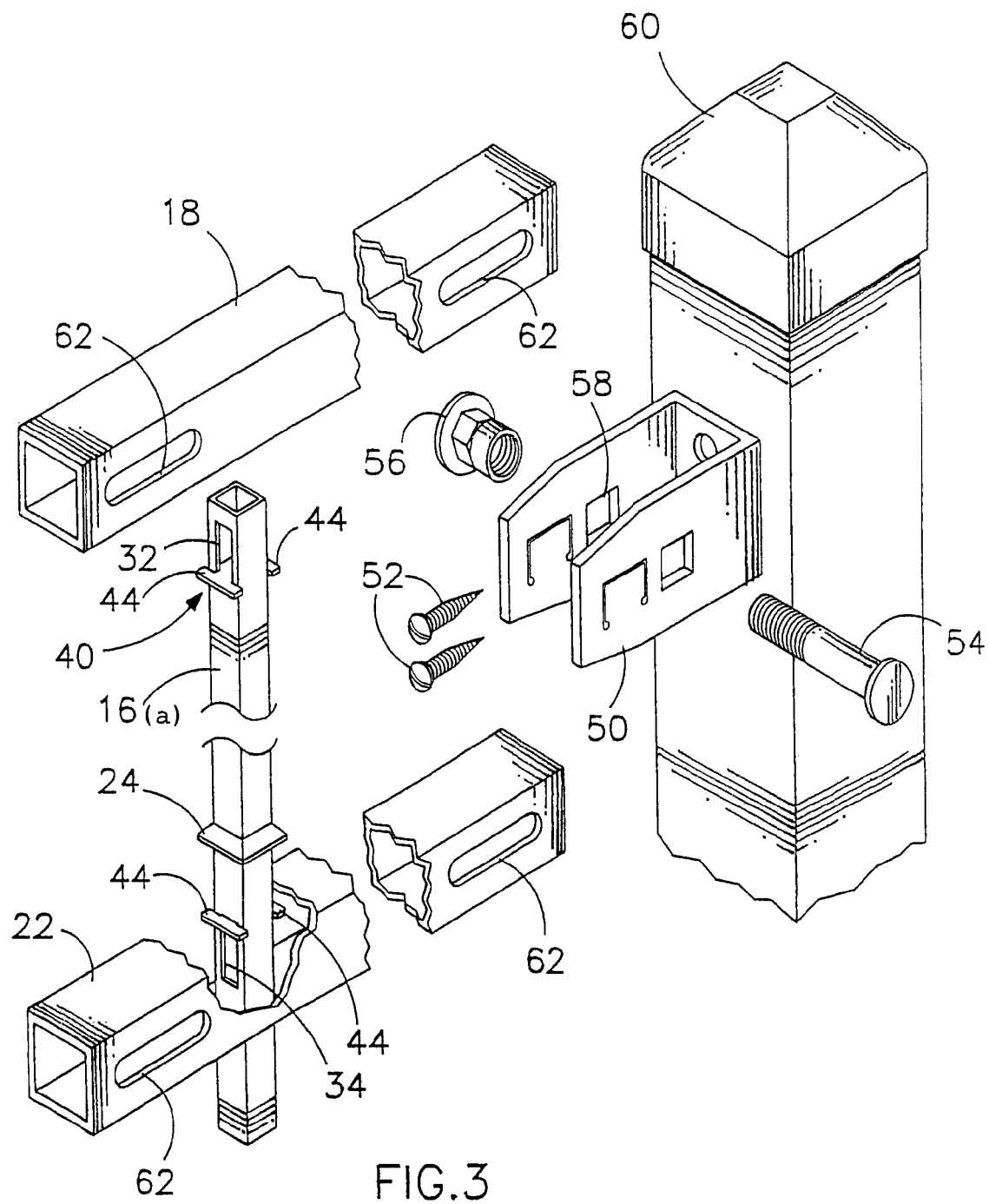
FIG. 3 is a partial enlarged exploded perspective view of an alternative embodiment of the present invention modular picket fence shown in FIG. 1.
Figure 4:
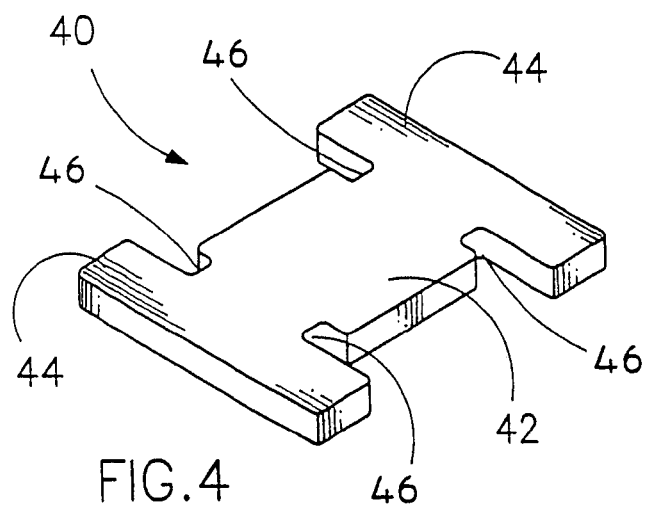
FIG. 4 is an enlarged perspective view of one of the plurality of H-shaped locking clips in accordance with the present invention.

Referring to FIGS. 3 and 4, there is shown the H-shaped locking clip or means 40 that includes a middle section 42 and two leg sections 44 which are formed at opposite ends of the middle section 42. The middle section 42 and the two leg sections 44 form four separate recesses 46 at locations where the middle section 42 and the two leg sections 44 are connected together. The H-shaped locking clip 40 is installed by having one of the leg sections 44 inserted into the locking slotted aperture, where the middle section 42 is concealed within the locking slotted aperture and the two leg sections are outside of the slotted aperture as shown in FIG. 3.

Figure 6:
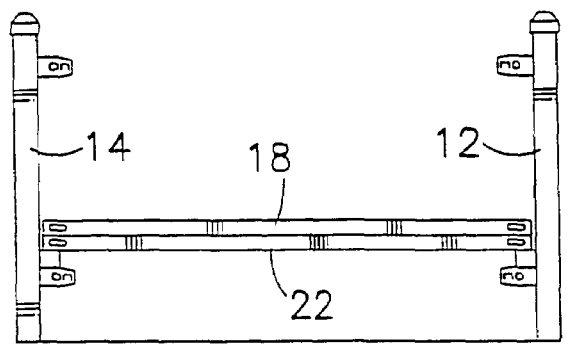
FIGS. 6(a) through 6(e) illustrates how the modular picket fence is assembled in accordance with the present invention.
FIG. 6(f) is a side elevational view of another arrangement of the modular picket fence in accordance with the present invention.
FIG. 6(g) is a side elevational view of a further arrangement of the modular picket fence in accordance with the present invention.
Figure 6:
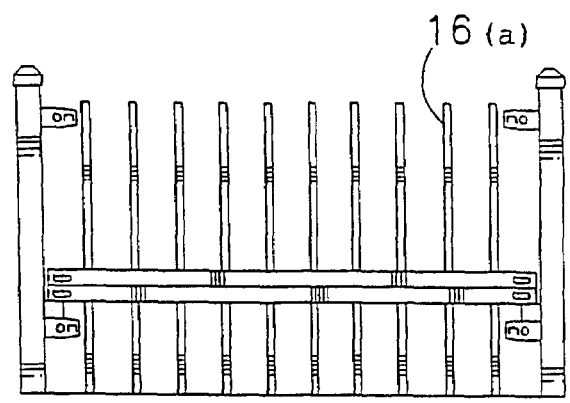
Figure 6:
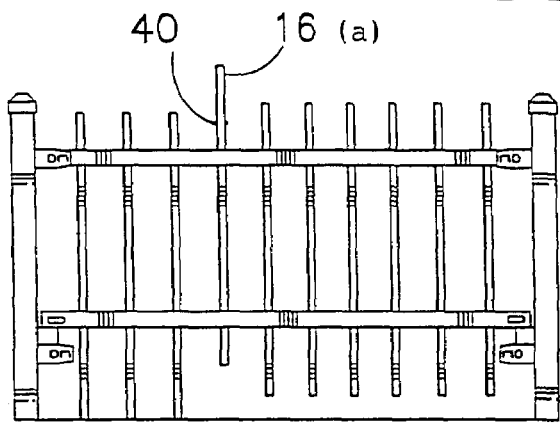
Figure 6:
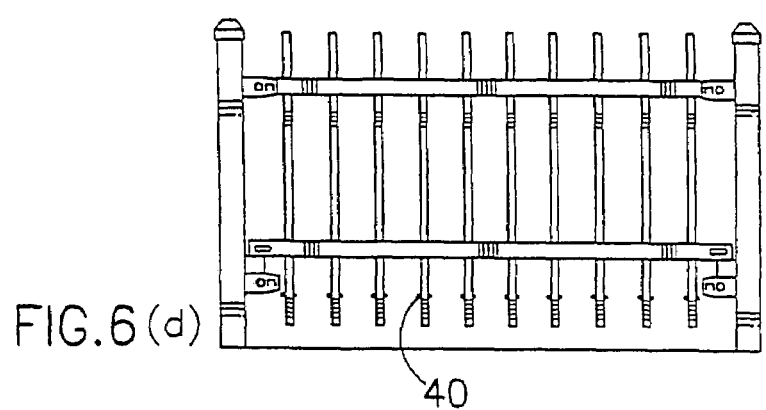
Figure 6:
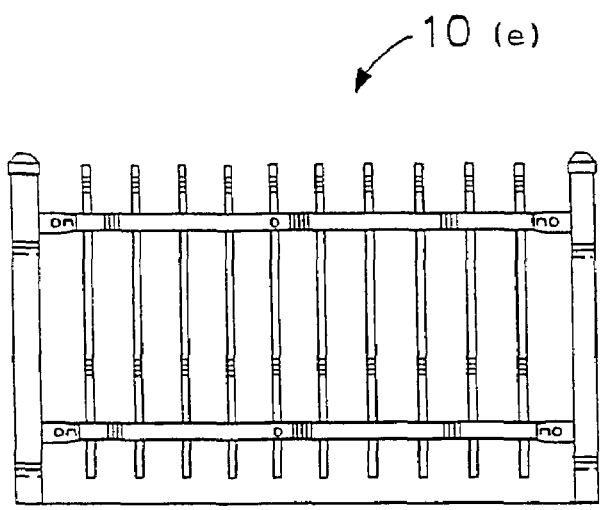
Figure 6:
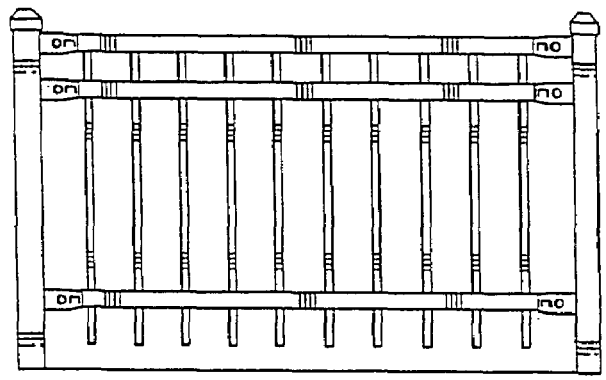
Figure 6:
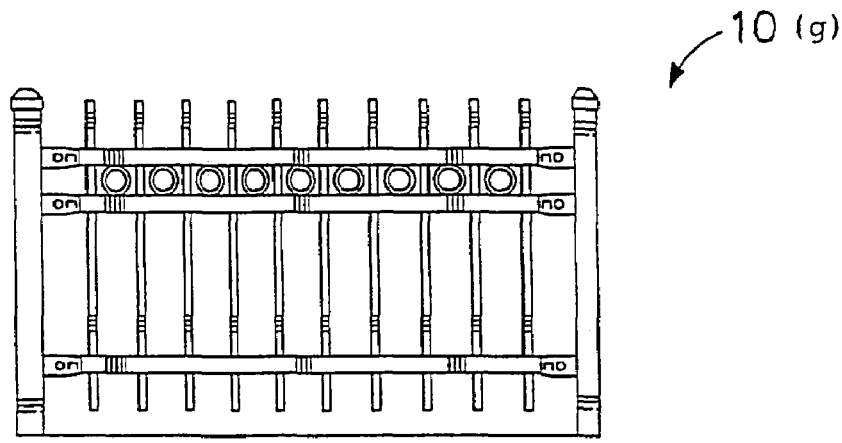

Referring to FIGS. 6(a)-6(e), in order to assemble the modular fence 10, the two vertical posts 12 and 14 are positioned at remote locations, where the brackets 50 of each post face each other as shown in FIG. 6(a). The pickets without pointed ends 16(a) are respectively inserted through the apertures 30 in the upper rail 18 and then inserted through the apertures 30 in the lower rail 22 as shown in FIG. 6(b). The pickets 16 are thereby in the assembly position as shown. The ends of the upper rail 18 are then attached to the bracket 50 of each post as shown. Each H-shaped locking clip 40 is respectively inserted into each upper and lower locking slotted apertures 32 and 34 of each picket 16 as shown in FIGS. 6(c) and 6(d), where the middle section 42 is located within the slotted locking aperture while the leg sections 44 are located external to the picket 16 as shown in FIG. 3. The upper H-shaped locking clips 40 engage against the upper surface or wall of the upper rail 18 (see FIG. 6(c)) while the lower H-shaped locking clips 40 engage against the lower surface or wall of the lower rail 22. The ends of the lower rail 22 are then attached to the bracket 50 of each post to provide a finish product as shown in FIG. 6(e). The modular fence for the configuration in FIG. 6(e) is designated as 10(e).

In the locking position, the H-shaped locking clips 40 frictionally abut the exterior walls of the rails, thereby preventing vertical displacement of the pickets 16. Once the pickets 16 are in the locking position, ornamental caps 24 are pushed downwardly such that the ornamental caps 24 are respectively inserted into the apertures 30 to form a tight smooth joint between picket and rail, thereby further preventing picket displacement, and preventing erosion of the joint through environmental wear and tear. Each picket is inserted and locked into place in the same manner.

The present invention may further include ornaments 80 which can be used with the first arrangement of the present invention. These ornaments 80 are attached to and between the pair of horizontal upper rails 18 and 20 as shown in FIGS. 1, 2 and 6(g) for decorative purposes, with the modular fence designated as 10(g).

Referring to FIG. 6(f), in this arrangement of the present invention, the modular picket fence is assembled as shown in FIG. 3.

The modular fence further includes bolts and nuts, where each bolt is inserted through a respective horizontal rail and picket for further securing the pickets to the rails.

The present invention conforms to conventional forms of manufacture or any other conventional way known to one skilled in the art.

Figure 7:
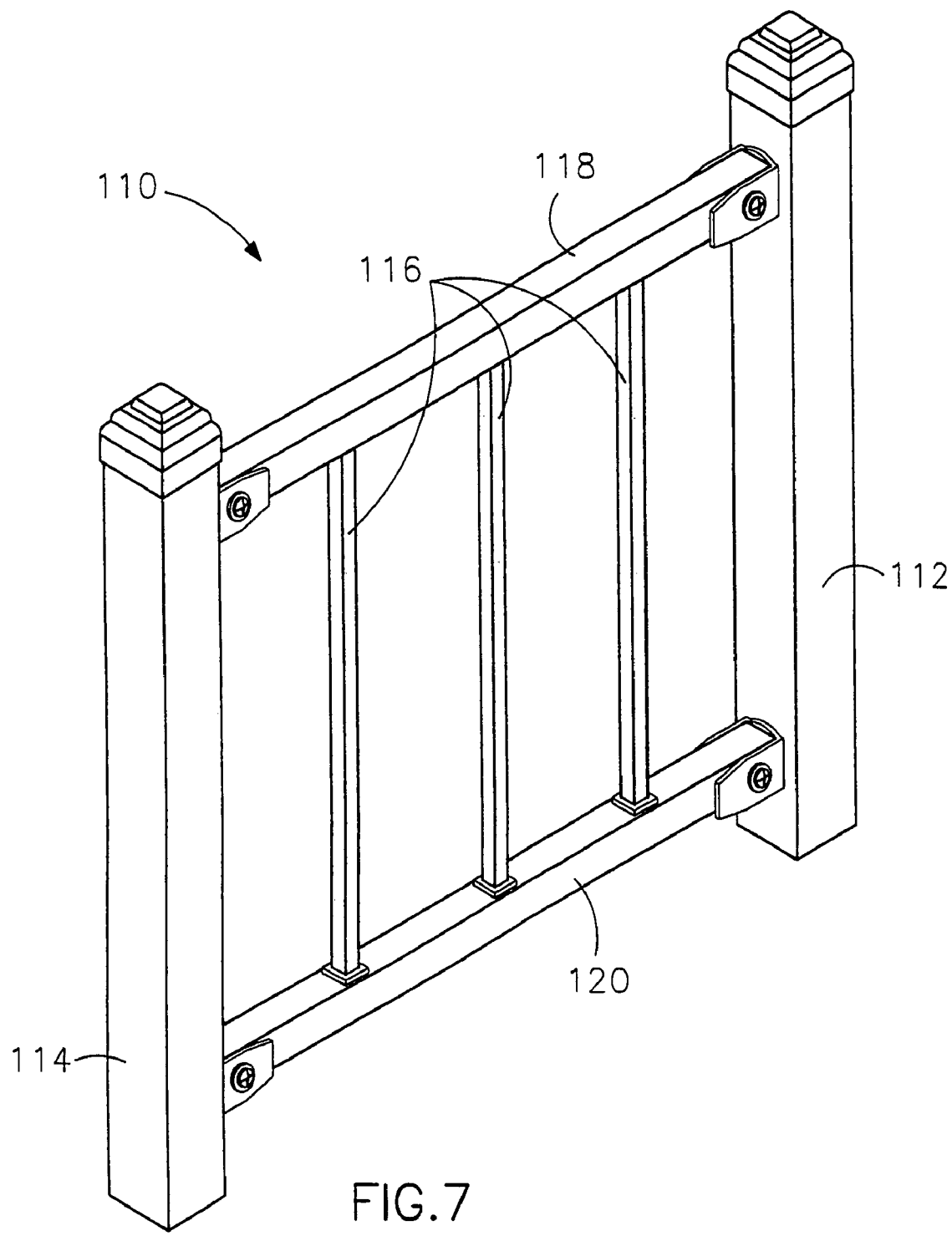
FIG. 7 is a perspective view of another alternative embodiment of a fully assembled modular picket fence in accordance with the present invention.

Referring to FIG. 7, there is shown at 110 another alternative embodiment of the present invention modular picket fence. This alternative embodiment of the present invention modular picket fence 110 comprises a pair of hollow vertical posts or columns 112 and 114 positioned to be secured to a support surface or any other suitable surface, a plurality of hollow vertically disposed pickets or poles 116, and a pair of spaced apart elongated hollow horizontal rails 118. In this example shown, the posts 112, 114, the pickets 116, and the rails 118 each has a square or rectangular shaped cross section configuration, but obviously may be of other cross-sectional configuration as desired.

In addition, for clarity purposes, only three vertical pickets 116 are shown. It will be appreciated that the vertical pickets 116 are not limited to the number of pickets illustrated in FIG. 7. It is emphasized that while three vertical pickets 116 are depicted, it is also within the spirit and scope of the present invention to have greater or smaller number of vertical pickets 116.

Figure 8:
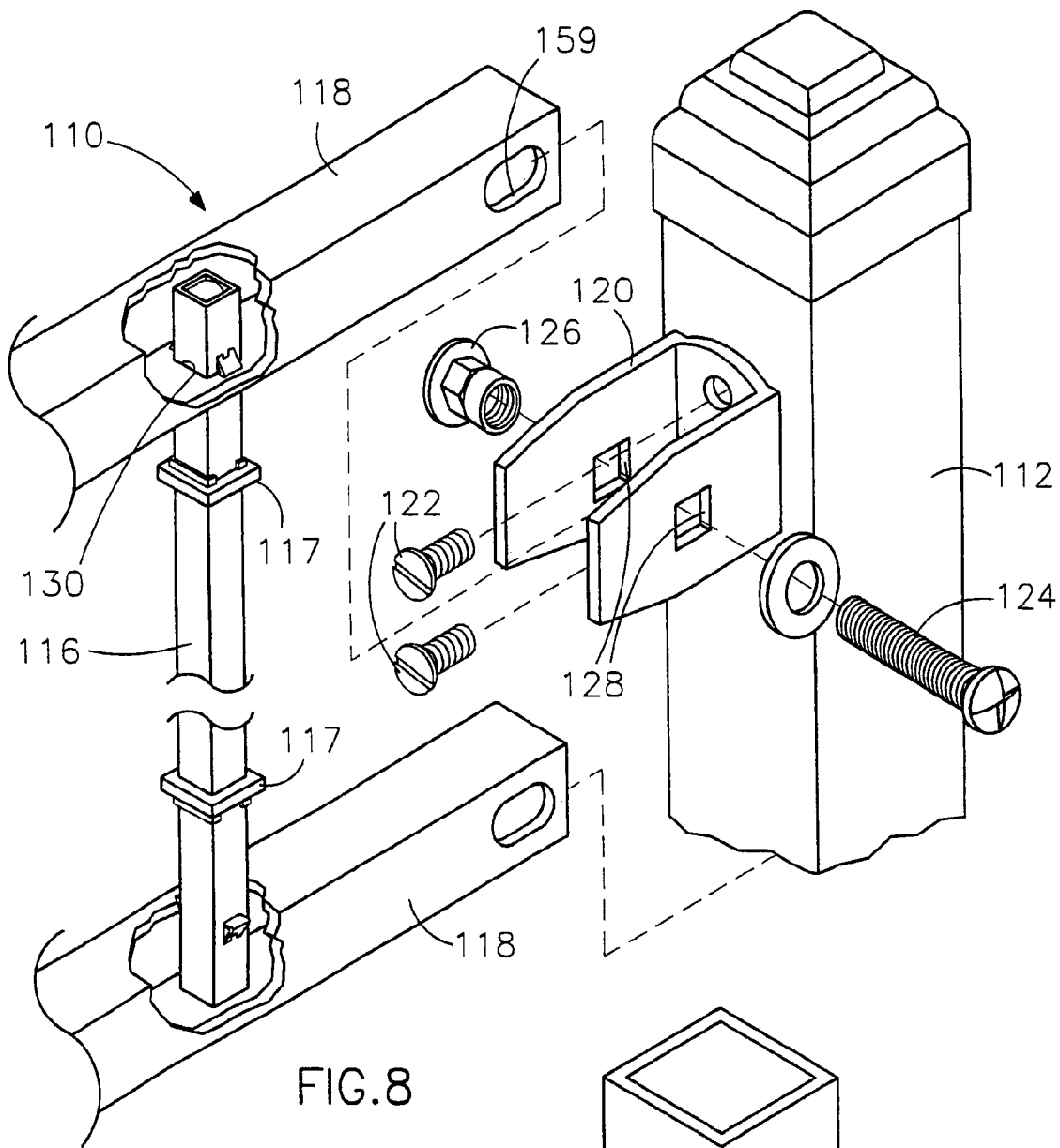
FIG. 8 is an exploded partial perspective view of the alternative embodiment of the present invention modular picket fence, where the picket has a square cross-section.
Figure 9A:
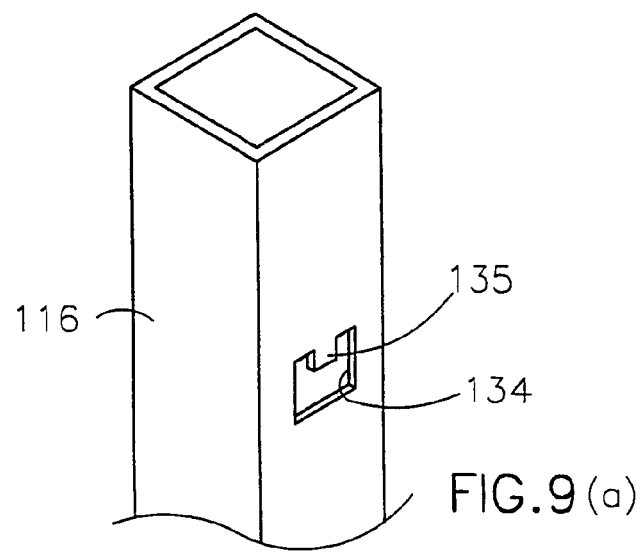
FIG. 9(a) is a partial perspective view of the top portion of a picket have a square cross-section used in the alternative embodiment of the present invention modular picket fence.
Figure 10A:
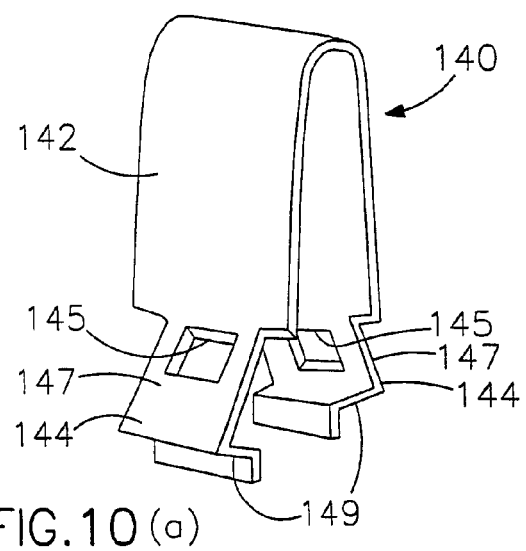
FIG. 10(a) is a perspective view of one of the preferred embodiments of the spring clip used in the alternative embodiment of the present invention modular picket fence.
Figure 9B:
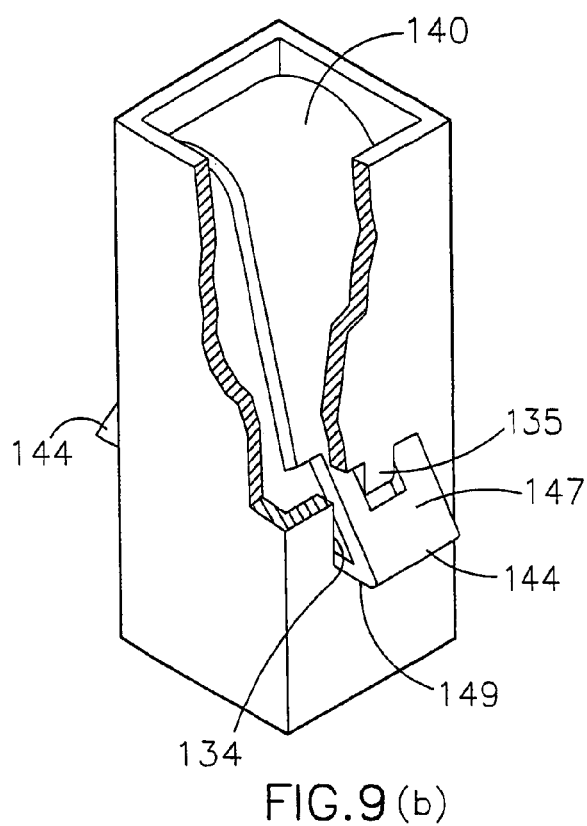
FIG. 9(b) is a partial perspective view of the top portion of a picket having a square cross-section with a spring clip assembled therein.
Figure 10B:
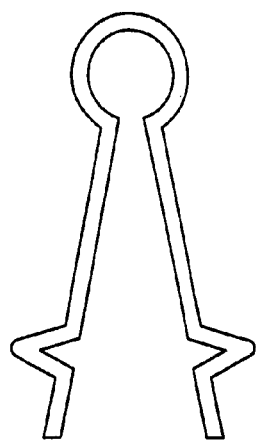
FIG. 10(b) is a side elevational view of another preferred embodiment of the present invention spring clip.
Figure 10:
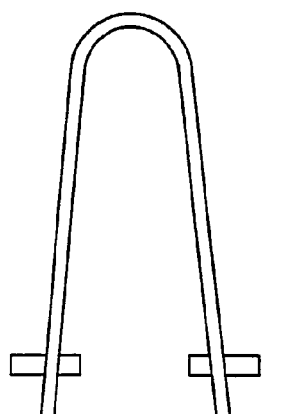
FIG. 10(c) is a side elevational view of still another preferred embodiment of the present invention spring clip.
FIG. 10(d) is a side elevational view of still another preferred embodiment of the present invention spring clip.
FIG. 10(e) is a side elevational view of still another preferred embodiment of the present invention spring clip.
Figure 10D:
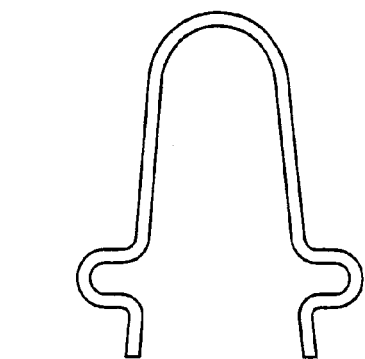

Referring to FIGS. 7 and 8, each of the vertical posts 112 and 114 are substantially identical, and to the extent they are, only one will be described in detail in the interest of brevity. A U-shaped metal brackets 120 is attached to the post 112 by screws 122 for removably attaching the proximal end of rail 118 by fastening bolts 124 and nuts 126 through the holes 128 on the U-shaped bracket 150 and also through the slotted aperture 159 at the proximal end of the rail 118.

Each of the horizontal rails 118 and 120 are substantially identical, and to the extend they are, only one will be described in detail in the interest of brevity. It will be appreciated that the horizontal rail can be of any desired cross-sectional shape. Therefore, while a horizontal rail 118 having a generally square shape has been illustrated, any cross-section of horizontal rail can be used with the present invention. The rail 118 has a plurality of non-circular apertures 130, preferably four-sided apertures for receiving the plurality of pickets 116, preferably four-sided pickets.

Figure 12:
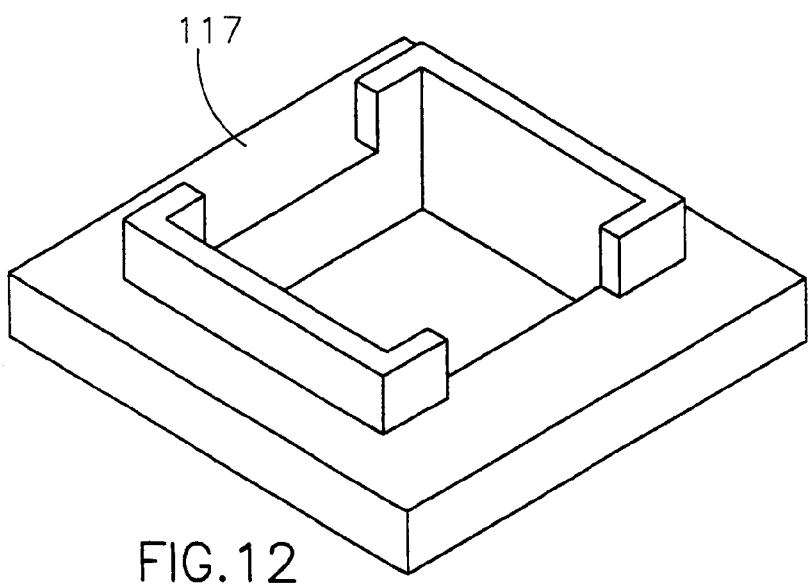
FIG. 12 is a perspective view of one of the preferred embodiments of the sealing cap used in the alternative embodiment of the present invention modular picket fence.

As shown in FIGS. 8 and 12, there are provided sealing caps 124 for each aperture 130 on the rails 118 and which is slidable on the picket 116 to position the sealing cap 124 for covering and sealing the aperture 130 after the pickets 116 are assembled.

As shown in FIGS. 8, 9(a), 9(b) and 10, at the end portion of each picket 116 there is provided two oppositely aligned transverse apertures 134 each having a locking tongue 135. A generally reversed U or V-shaped spring clip 140 is inserted at the end portion of the picket 116.

The spring clip 140 may be made of metal or other suitable material with a memory to return to its pre-deformed shape after being compressed or squeezed. The spring clip 140 has a generally reversed U or V-shaped configuration with a bent middle portion 142 and two opposite end portions where there are provided outwardly protruding stoppers 142 which, when the spring clip 140 is inserted into the end portion of picket 116, will extend outwardly through the transverse apertures 134 thereof. Each stopper 142 has an opening 145 which receives the locking tongue 135 of the picket 116, thereby preventing movement of the spring clip 140 inside the picket 116.

Each stopper 142 of the spring clip 140 has a ramp side 147 and a right-angle side As the end portion of the picket 116 (with the spring clip 140 inserted) is inserted through the aperture 130 of the rail 118, the ramp side 147 of the spring clip 140 will engage with the edges of the aperture 130 of the rail 118 first, causing the spring clip 140 to be compressed, thereby allowing end portion of the picket 116 to be inserted further through the aperture 130.

Once the ramp side 147 of the spring clip 140 passes the edges of the aperture 130 of the rail 118, the spring clip 140 will expand back, causing the right-angle side 149 of the spring clip 140 to engage and rest upon the interior surface of the hollow rail 118 (as shown in FIG. 8).

Once the stoppers 144 of the spring clip snap in place inside the aperture 130 of the rail 118, the end portion of the picket 116 is locked therein and cannot be removed. This mechanism secures the picket 116 to the rail 118.

Other similar embodiments of the present invention spring clip are shown in FIGS. 10(b)-10(e).

Figure 11:
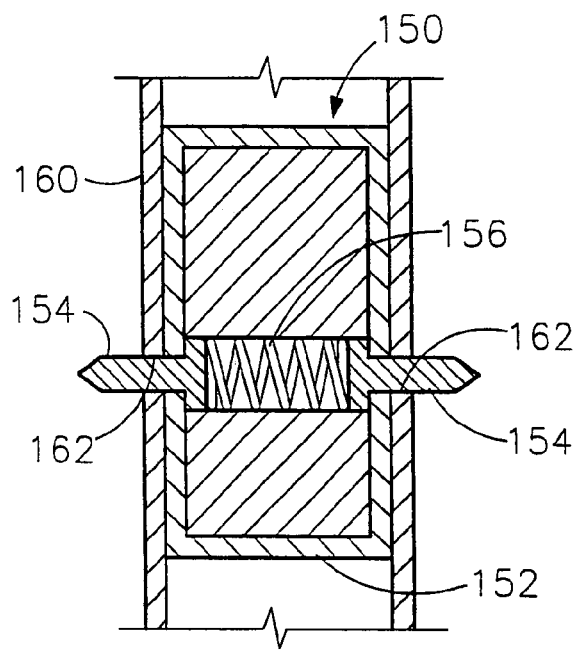
FIG. 11 is a cross-sectional side view of an alternative embodiment of the present invention spring clip.
Figure 10:
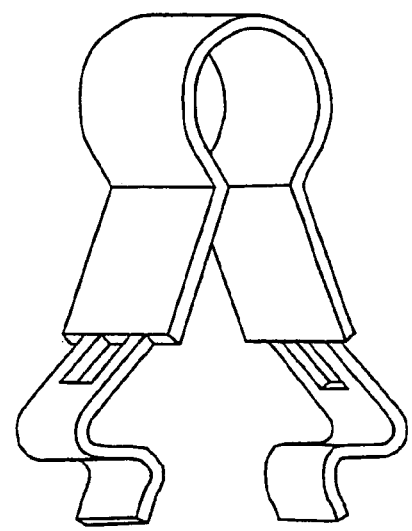

An alternative embodiment of the present invention spring clip is shown in FIG. 11. In this alternative embodiment, spring clip 150 includes a hollow block 152 which is inserted into the end portion of a picket 160. Two oppositely disposed stoppers 154 are assembled inside the clip 150 and biased by an internal spring 156. The stoppers 154 are extending through corresponding openings 162 at the end portions of the picket 160. The stoppers 154 can be compressed inwardly to allow the end portion of the picket 160 to be inserted into the aperture 130 of the rail 118. Once inside the rail 18, the stoppers 154 will extend back, which secures the end portion of the picket 160 to the rail 118.

Figure 13:
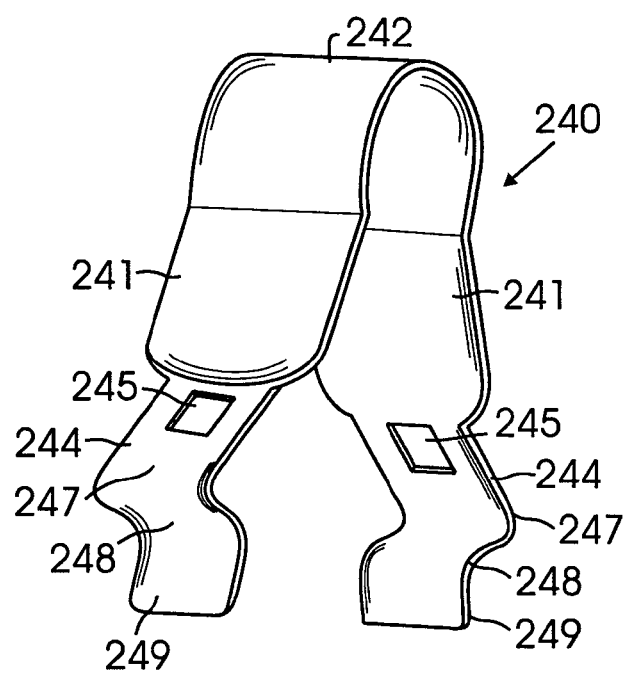
FIG. 13 is a perspective view of a new and improved embodiment of the spring clip used in the alternative embodiment of the present invention modular picket fence.
Figure 14:
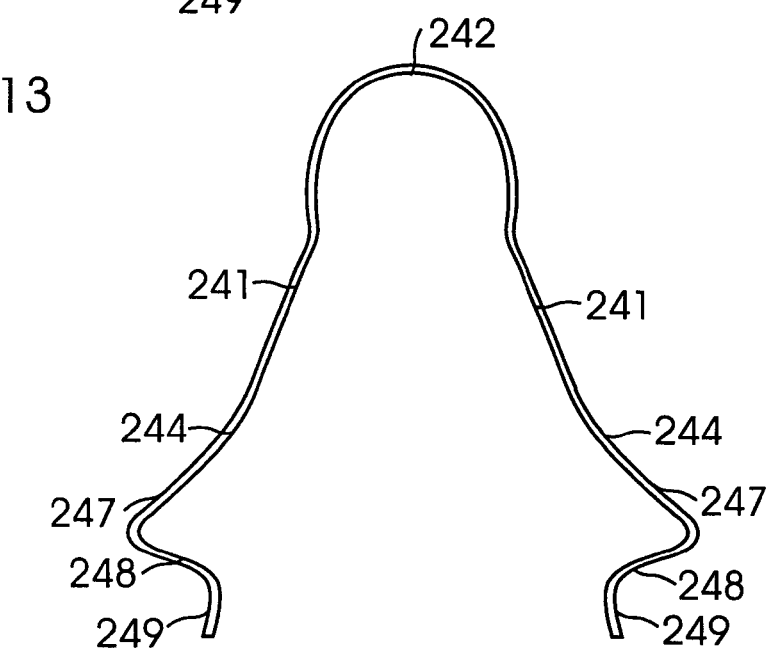
FIG. 14 is a side elevational view of the new and improved embodiment of the spring clip used in the alternative embodiment of the present invention modular picket fence.

The new and improved spring clip 240 is illustrated in FIGS. 13 and 14. The spring clip 240 may be made of metal or other suitable material with a memory to return to its pre-deformed shape after being compressed or squeezed. The spring clip 240 has a generally reversed U or V-shaped configuration with a bent middle portion 242 extending to a pair of side sections 241 each of which extend to a respective one of a pair of outwardly protruding stoppers 244. When the spring clip is inserted into the end portion of a picket (as will be discussed in the following paragraphs) the stoppers will extend through the transverse apertures of the picket.

Each stopper 244 has an opening 245 which receives a locking tongue of a picket, thereby preventing movement of the spring clip 240 inside the picket.

Each stopper 244 of the spring clip 240 has an upper ramp side 247, a lower ramp side 248 and a transverse vertical tip 249. As the end portion of a picket (with the spring clip 240 inserted) is inserted through an aperture of a horizontal rail, the upper ramp side 247 of the spring clip 240 will engage the edges of the aperture of the rail, first causing the spring clip 240 to be compressed, thereby allowing the end portion of the picket to be inserted further through the aperture in the horizontal rail. Once the upper ramp side 247 of the spring clip 240 passes the edges of the aperture in the horizontal rail, the spring clip 240 will expand back, causing the vertical tip of the spring clip to be compressed against the interior wall of the picket while the lower ramp side 248 of the spring clip 240 will engage and rest upon the interior surface of the hollow rail.

Once the stoppers 244 of the spring clip 240 snap in place inside the aperture in the horizontal rail, the end portion of the picket is locked therein and cannot be removed. The mechanism secures the picket to the horizontal rail.

The present invention can be utilized with a picket of any desired cross-section including square, narrow rectangular, wide rectangular, oval, round, narrow polygonal and wide polygonal. In the previous embodiment discussed in FIGS. 8, 9(*a*) and 9(*b*), the picket 116 had a square cross-section. The present invention will now be discussed using pickets having other cross-sections.

While only one surface of a horizontal rail is illustrated in FIGS. 17, 20, 23, 26, 29 and 32, it will be appreciated that each cross-sectional variation has corresponding upper and lower locking members such as illustrated in FIG. 8. For the upper horizontal rail the locking member rests against and above the lower horizontal surface and for the upper horizontal rail the locking member rests against and below the upper horizontal surface.

Figure 15:
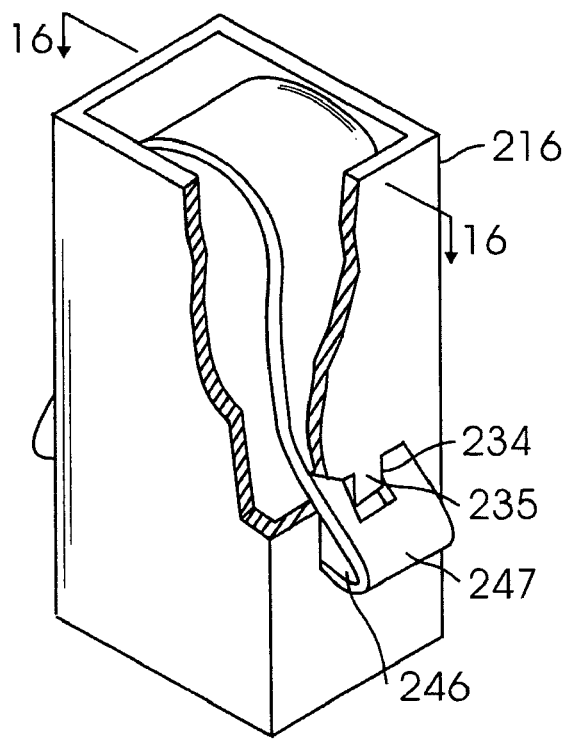
FIG. 15 is a partial perspective view of the top portion of the picket having a narrow rectangular cross-section with a spring clip assembled therein.
Figure 16:
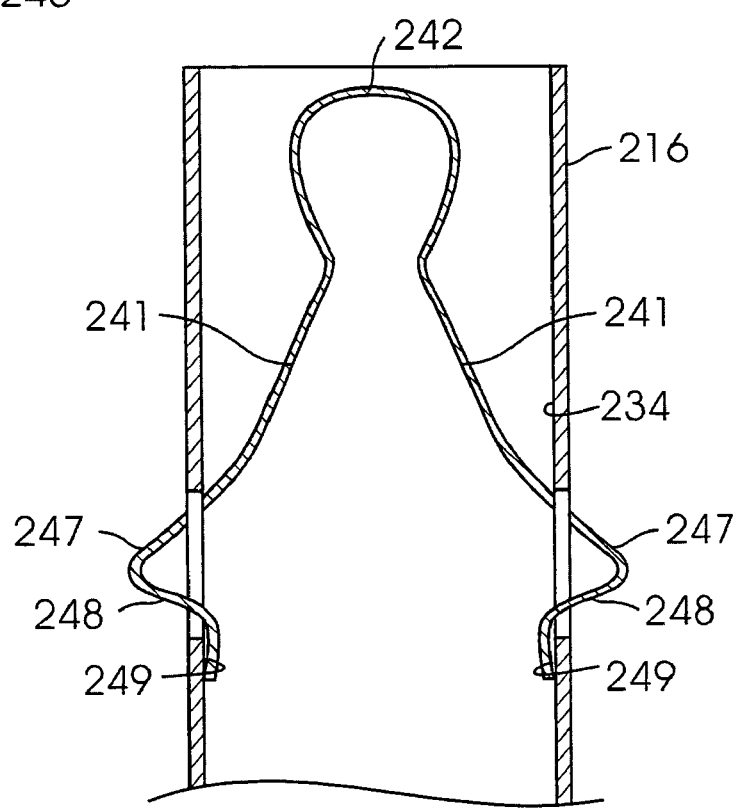
FIG. 16 is a cross-sectional view of the spring clip inside the picket having a narrow rectangular cross-section.
Figure 17:
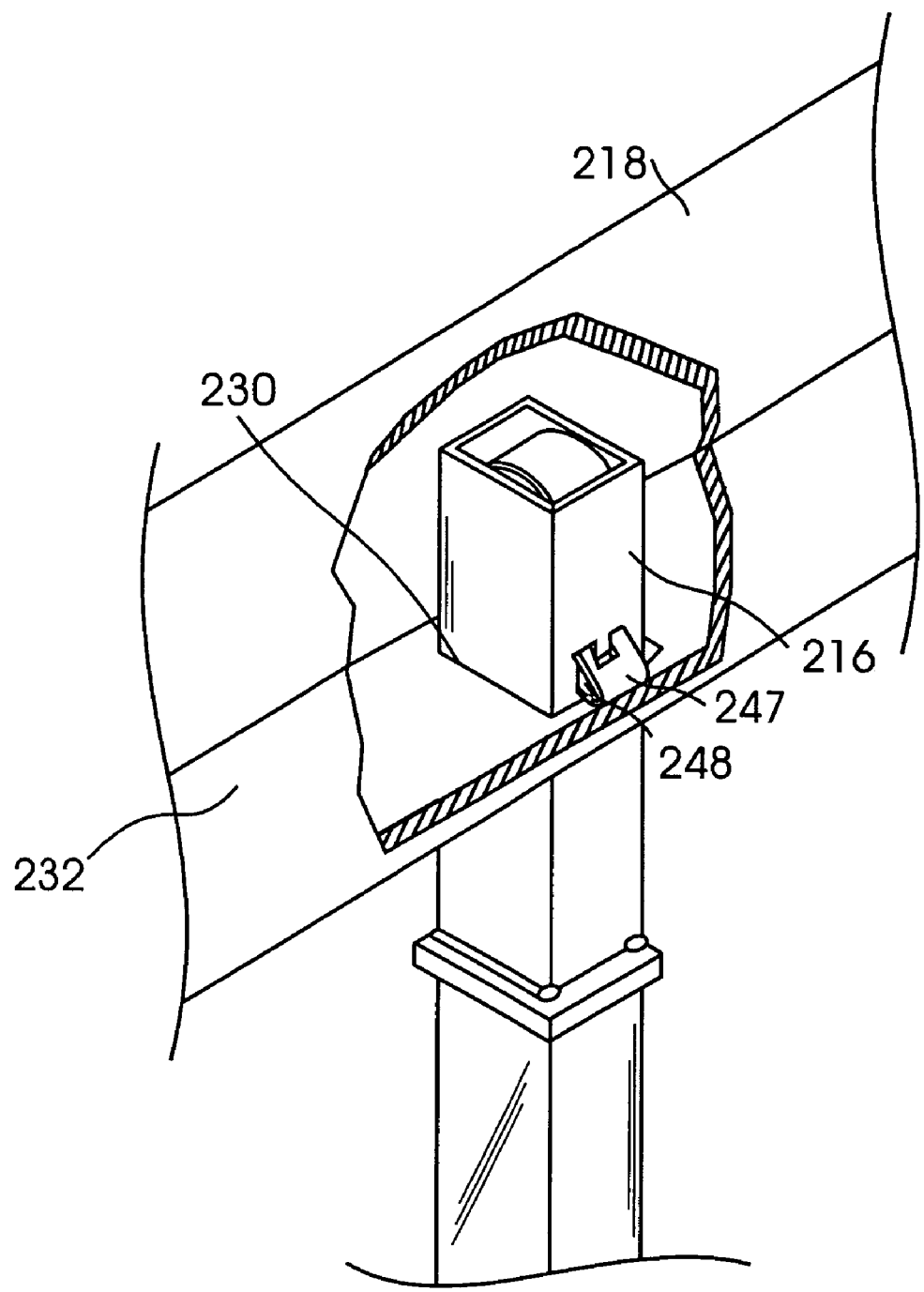
FIG. 17 is an open interior view of a horizontal rail of a fence with the picket having a narrow rectangular cross section with a spring clip assembled therein retained within the horizontal fence rail.

Referring to FIGS. 15 through 17, the present invention is utilized with a picket 216 have a narrow rectangular cross-section. The spring clip 240 may be made of metal or other suitable material with a memory to return to its pre-deformed shape after being compressed or squeezed. The spring clip 240 has a generally reversed U or V-shaped configuration with a bent middle portion 242 extending to a pair of side sections 241 each of which extend to a respective one of a pair of outwardly protruding stoppers 244. When the spring clip is inserted into the end portion of a picket having a narrow rectangular cross-section 216, the stoppers 244 will extend through the transverse apertures 234 of the picket 216.

Each stopper 244 has an opening 245 which receives a locking tongue 235 of a picket 216, thereby preventing movement of the spring clip 240 inside the picket 216.

Each stopper 244 of the spring clip 240 has an upper ramp side 247, a lower ramp side 248 and a transverse vertical tip 249. As the end portion of a picket 216 (with the spring clip 240 inserted) is inserted through a conforming shape narrow rectangular aperture 230 in the lower surface 232 of a horizontal rail 218 of any cross-sectional configuration, the upper ramp side 247 of the spring clip 240 will engage the edges of the aperture 230 of the rail 218, first causing the spring clip 240 to be compressed, thereby allowing the end portion of the picket 216 to be inserted further through the aperture 230 in the horizontal rail 218. Once the upper ramp side 247 of the spring clip 240 passes the edges of the aperture 230 in the horizontal rail 218, the spring clip 240 will expand back, causing the vertical tip 249 of the spring clip 240 to be compressed against the interior wall 234 of the picket 216 while the lower ramp side 248 of the spring clip 240 will engage and rest upon the interior surface 232 of the hollow rail 218.

Once the stoppers 244 of the spring clip 240 snap in place inside the aperture 230 in the horizontal rail 218, the end portion of the picket 216 is locked therein and cannot be removed. The mechanism secures the picket 216 to the horizontal rail 218.

The modular fence and its components for this design are made from material selected from the group comprising steel, aluminum and vinyl.

Figure 18:
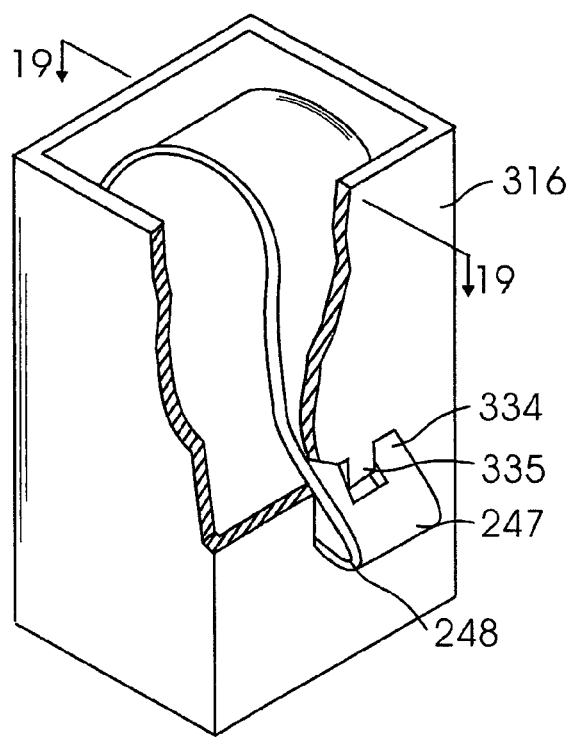
FIG. 18 is a partial perspective view of the top portion of the picket having a wide rectangular cross-section with a spring clip assembled therein.
Figure 19:
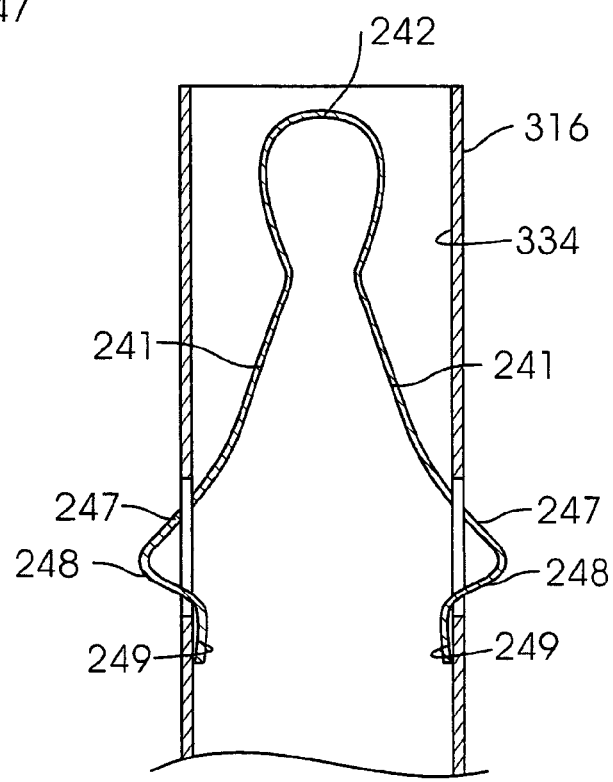
FIG. 19 is a cross-sectional view of the spring clip inside the picket having a wide rectangular cross-section.
Figure 20:
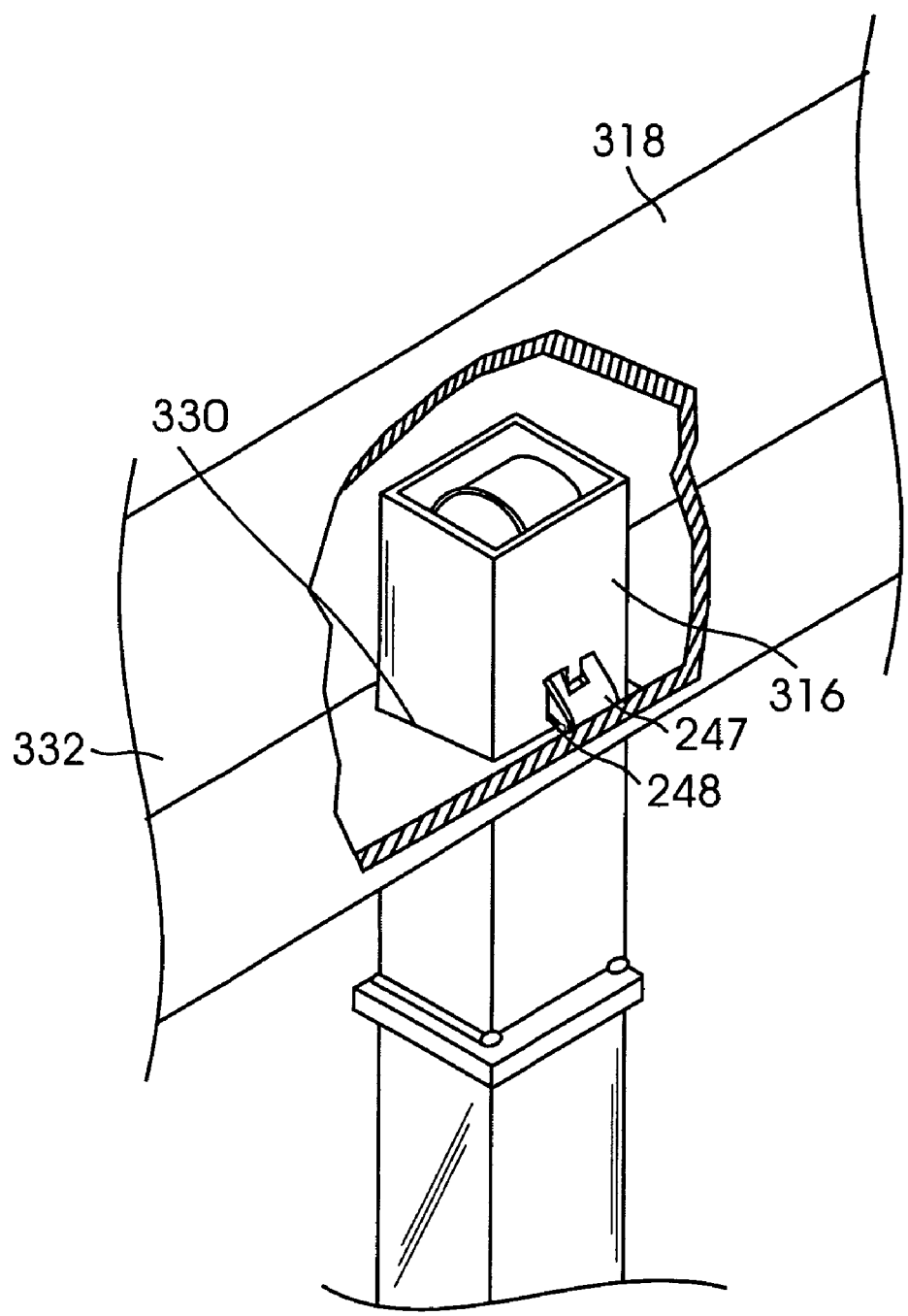
FIG. 20 is an open interior view of a horizontal rail of a fence with the picket having a wide rectangular cross section with a spring clip assembled therein retained within the horizontal fence rail.

Referring to FIGS. 18 through 20, the present invention is utilized with a picket 316 have a wide rectangular cross-section. The spring clip 240 may be made of metal or other suitable material with a memory to return to its pre-deformed shape after being compressed or squeezed. The spring clip 240 has a generally reversed U or V-shaped configuration with a bent middle portion 242 extending to a pair of side sections 241 each of which extend to a respective one of a pair of outwardly protruding stoppers 244. When the spring clip is inserted into the end portion of a picket having a wide rectangular cross-section 316, the stoppers 244 will extend through the transverse apertures 334 of the picket 316.

Each stopper 244 has an opening 245 which receives a locking tongue 335 of a picket 316, thereby preventing movement of the spring clip 240 inside the picket 316.

Each stopper 244 of the spring clip 240 has an upper ramp side 247, a lower ramp side 248 and a transverse vertical tip 249. As the end portion of a picket 316 (with the spring clip 240 inserted) is inserted through a conforming shape narrow rectangular aperture 330 in the lower surface 332 of a horizontal rail 318 of any cross-sectional configuration, the upper ramp side 247 of the spring clip 240 will engage the edges of the aperture 330 of the rail 318, first causing the spring clip 240 to be compressed, thereby allowing the end portion of the picket 316 to be inserted further through the aperture 330 in the horizontal rail 318. Once the upper ramp side 247 of the spring clip 240 passes the edges of the aperture 330 in the horizontal rail 218, the spring clip 240 will expand back, causing the vertical tip 249 of the spring clip 240 to be compressed against the interior wall 334 of the picket 316 while the lower ramp side 248 of the spring clip 240 will engage and rest upon the interior surface 332 of the hollow rail 318.

Once the stoppers 244 of the spring clip 240 snap in place inside the aperture 330 in the horizontal rail 318, the end portion of the picket 316 is locked therein and cannot be removed. The mechanism secures the picket 316 to the horizontal rail 318.

The modular fence and its components for this design are made from material selected from the group comprising steel, aluminum and vinyl.

Figure 21:
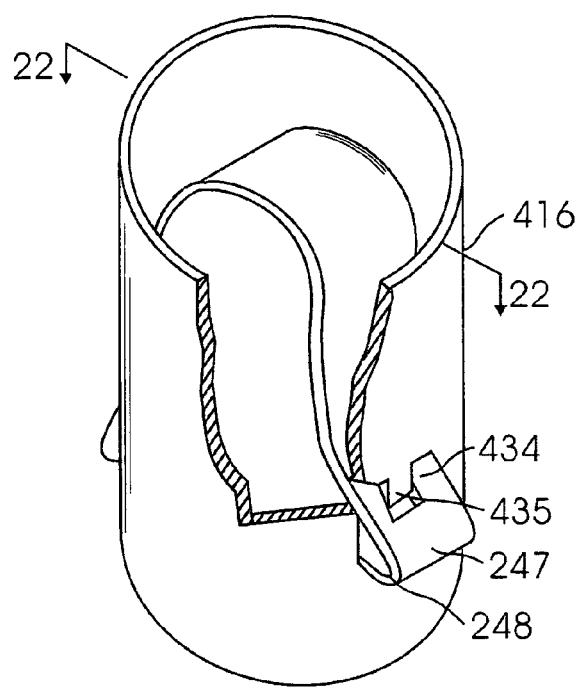
FIG. 21 is a partial perspective view of the top portion of the picket having an oval cross-section with a spring clip assembled therein.
Figure 22:
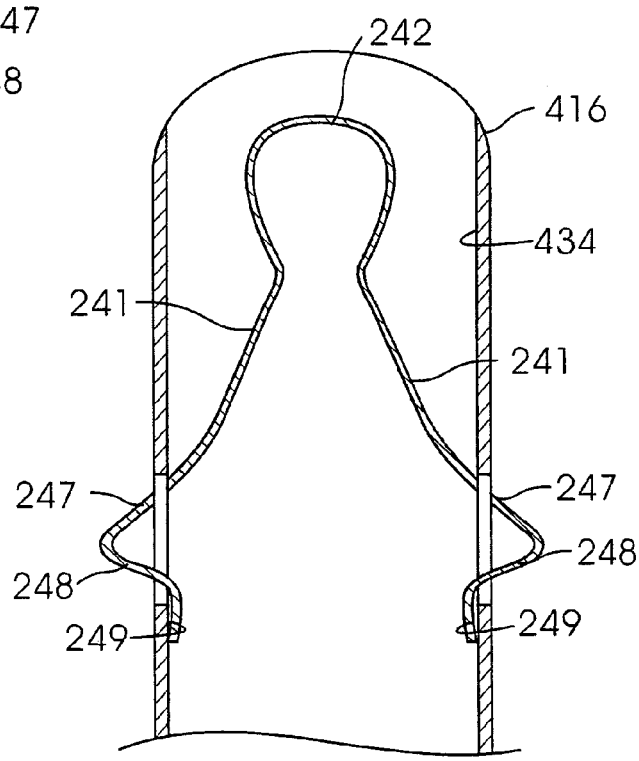
FIG. 22 is a cross-sectional view of the spring clip inside the picket having an oval cross-section.
Figure 23:
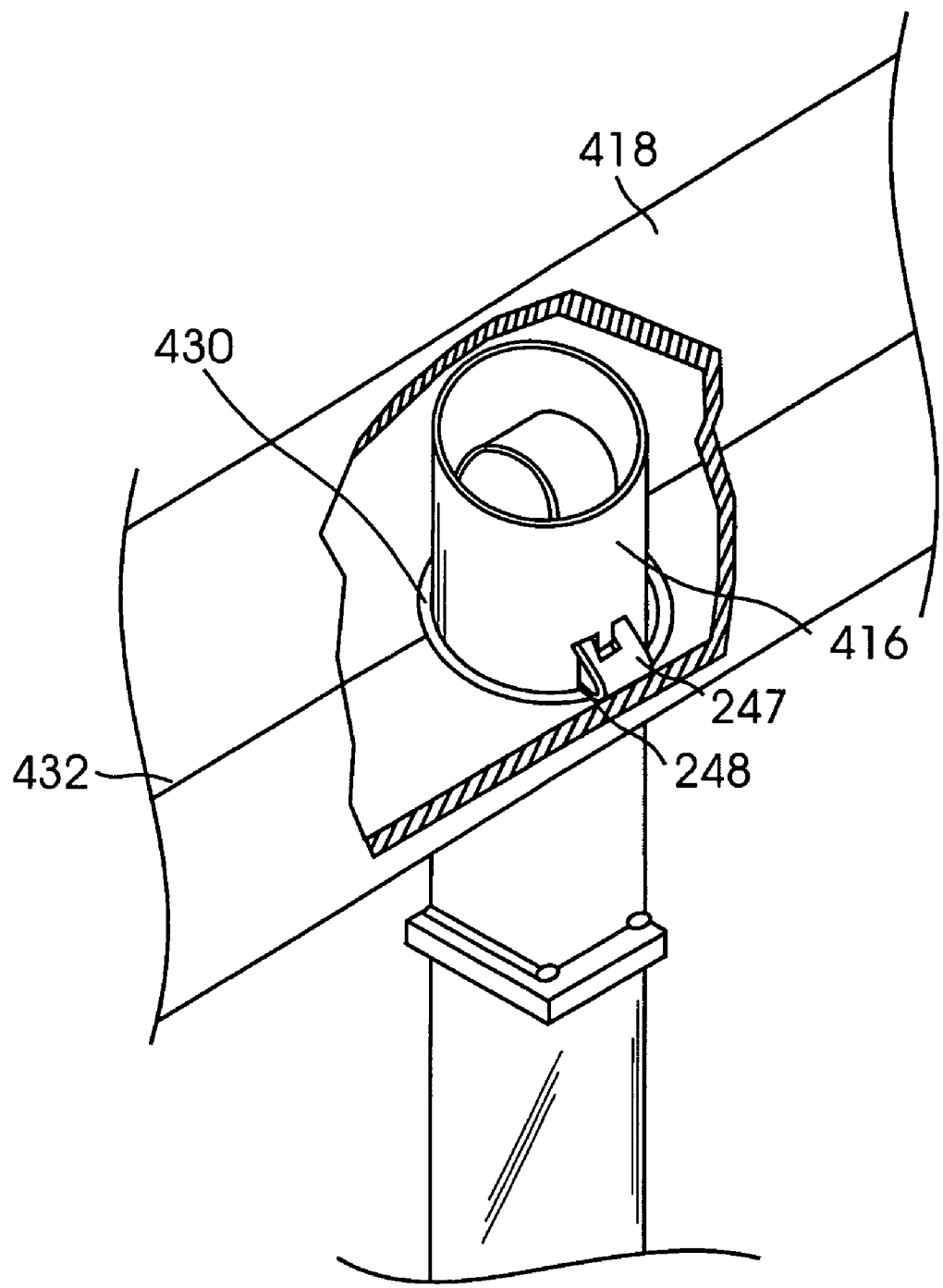
FIG. 23 is an open interior view of a horizontal rail of a fence with the picket having an oval cross section with a spring clip assembled therein retained within the horizontal fence rail.

Referring to FIGS. 21 through 23, the present invention is utilized with a picket 416 have an oval cross-section. The spring clip 240 may be made of metal or other suitable material with a memory to return to its pre-deformed shape after being compressed or squeezed. The spring clip 240 has a generally reversed U or V-shaped configuration with a bent middle portion 242 extending to a pair of side sections 241 each of which extend to a respective one of a pair of outwardly protruding stoppers 244. When the spring clip is inserted into the end portion of a picket having an oval cross-section 416, the stoppers 244 will extend through the transverse apertures 434 of the picket 416.

Each stopper 244 has an opening 245 which receives a locking tongue 435 of a picket 416, thereby preventing movement of the spring clip 240 inside the picket 416.

Each stopper 244 of the spring clip 240 has an upper ramp side 247, a lower ramp side 248 and a transverse vertical tip 249. As the end portion of a picket 416 (with the spring clip 240 inserted) is inserted through a conforming oval shaped aperture 430 in the lower surface 432 of a horizontal rail 418 of any cross-sectional configuration, the upper ramp side 247 of the spring clip 240 will engage the edges of the aperture 430 of the rail 418, first causing the spring clip 240 to be compressed, thereby allowing the end portion of the picket 416 to be inserted further through the aperture 430 in the horizontal rail 418. Once the upper ramp side 247 of the spring clip 240 passes the edges of the aperture 430 in the horizontal rail 218, the spring clip 240 will expand back, causing the vertical tip 249 of the spring clip 240 to be compressed against the interior wall 434 of the picket 416 while the lower ramp side 248 of the spring clip 240 will engage and rest upon the interior surface 432 of the hollow rail 418.

Once the stoppers 244 of the spring clip 240 snap in place inside the aperture 430 in the horizontal rail 418, the end portion of the picket 416 is locked therein and cannot be removed. The mechanism secures the picket 416 to the horizontal rail 418.

The modular fence and its components for this design are made from material selected from the group comprising steel, aluminum and vinyl.

Figure 24:
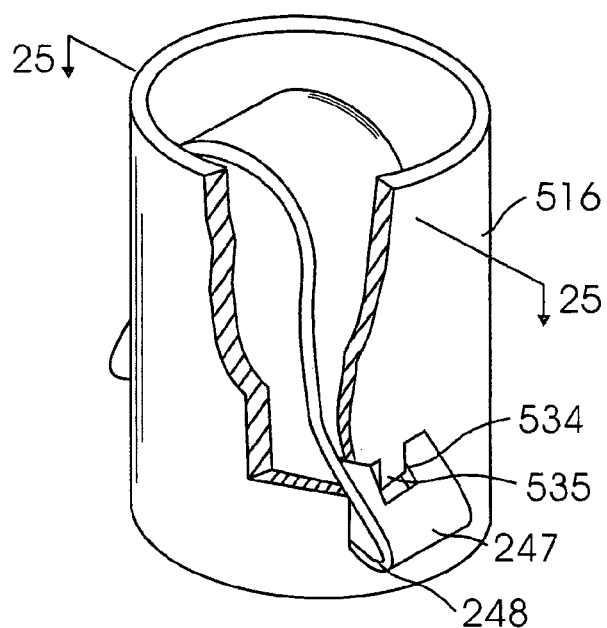
FIG. 24 is a partial perspective view of the top portion of the picket having a round cross-section with a spring clip assembled therein.
Figure 25:
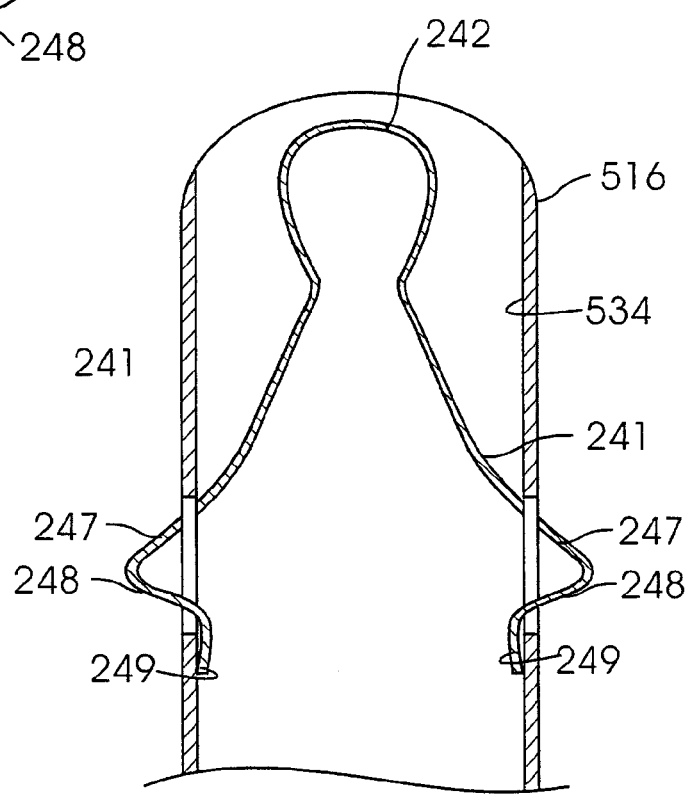
FIG. 25 is a cross-sectional view of the spring clip inside the picket having a round cross-section.
Figure 26:
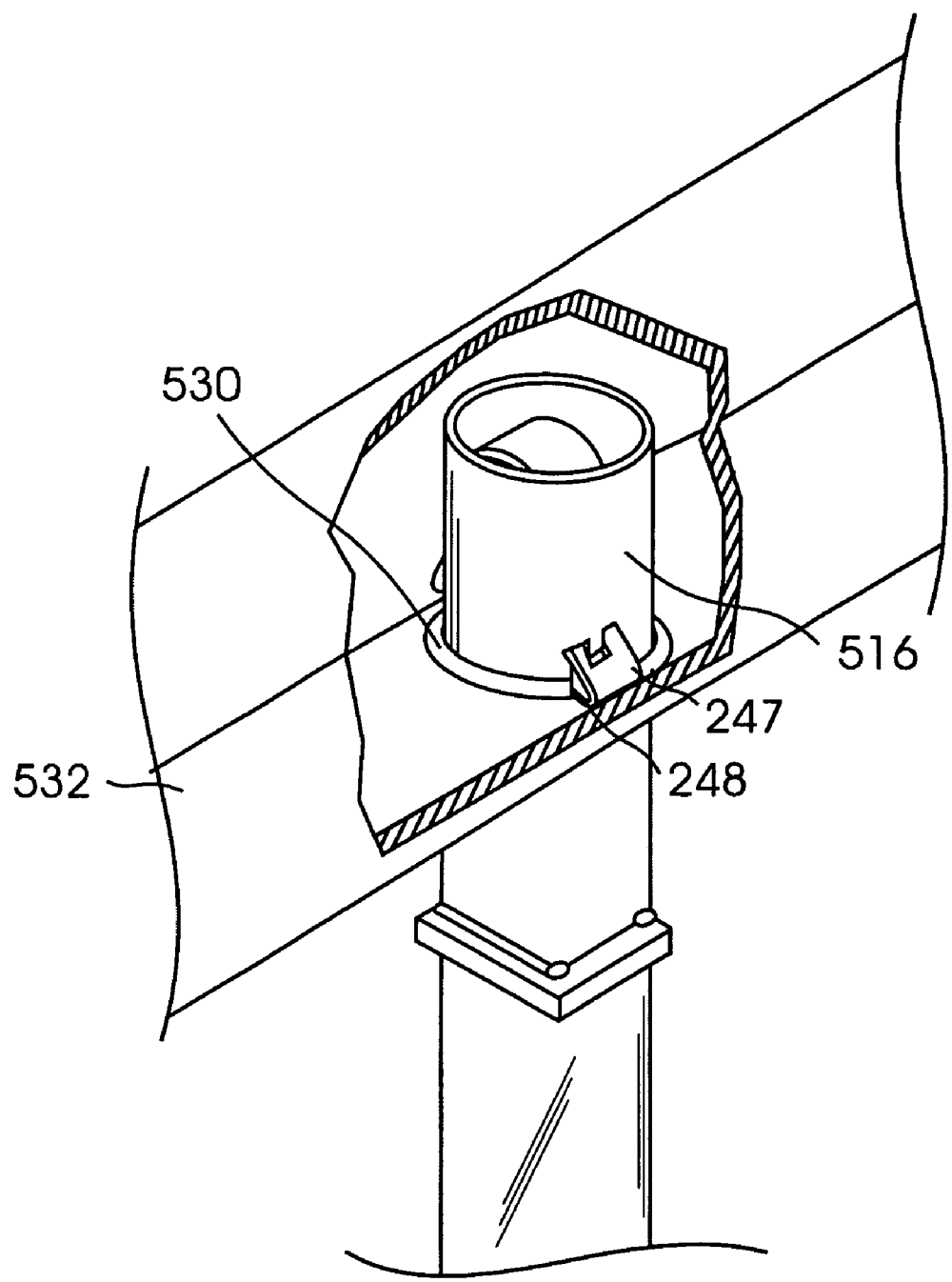
FIG. 26 is an open interior view of a horizontal rail of a fence with the picket having a round cross section with a spring clip assembled therein retained within the horizontal fence rail.

Referring to FIGS. 24 through 26, the present invention is utilized with a picket 516 have a round cross-section. The spring clip 240 may be made of metal or other suitable material with a memory to return to its pre-deformed shape after being compressed or squeezed. The spring clip 240 has a generally reversed U or V-shaped configuration with a bent middle portion 242 extending to a pair of side sections 241 each of which extend to a respective one of a pair of outwardly protruding stoppers 244. When the spring clip is inserted into the end portion of a picket having a round cross-section 516, the stoppers 244 will extend through the transverse apertures 534 of the picket 516.

Each stopper 244 has an opening 245 which receives a locking tongue 535 of a picket 516, thereby preventing movement of the spring clip 240 inside the picket 516.

Each stopper 244 of the spring clip 240 has an upper ramp side 247, a lower ramp side 248 and a transverse vertical tip 249. As the end portion of a picket 516 (with the spring clip 240 inserted) is inserted through a conforming round shaped aperture 530 in the lower surface 532 of a horizontal rail 518 of any cross-sectional configuration, the upper ramp side 247 of the spring clip 240 will engage the edges of the aperture 530 of the rail 518, first causing the spring clip 240 to be compressed, thereby allowing the end portion of the picket 516 to be inserted further through the aperture 530 in the horizontal rail 518. Once the upper ramp side 247 of the spring clip 240 passes the edges of the aperture 530 in the horizontal rail 518, the spring clip 240 will expand back, causing the vertical tip 249 of the spring clip 240 to be compressed against the interior wall 534 of the picket 516 while the lower ramp side 248 of the spring clip 240 will engage and rest upon the interior surface 532 of the hollow rail 518.

Once the stoppers 244 of the spring clip 240 snap in place inside the aperture 530 in the horizontal rail 518, the end portion of the picket 516 is locked therein and cannot be removed. The mechanism secures the picket 516 to the horizontal rail 518.

The modular fence and its components for this design are made from material selected from the group comprising steel, aluminum and vinyl.

Figure 27:
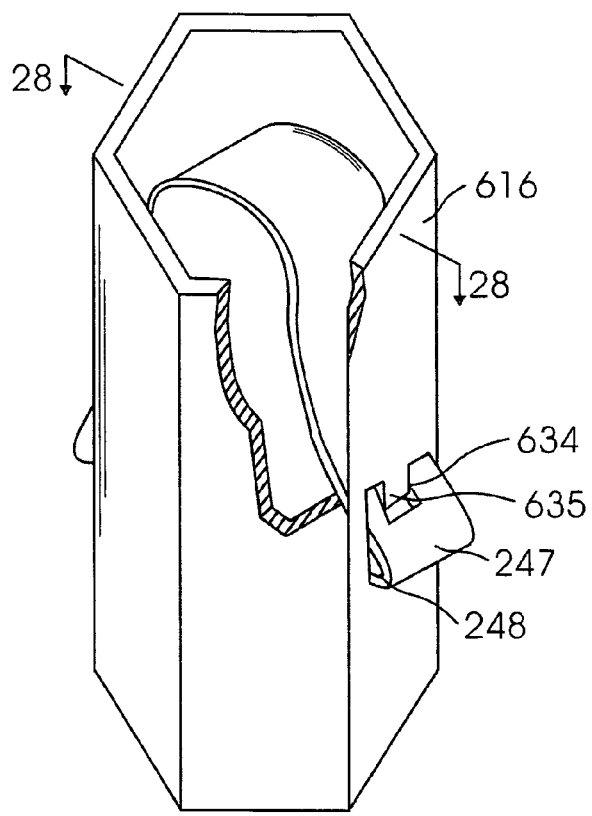
FIG. 27 is a partial perspective view of the top portion of the picket having a narrow polygonal cross-section with a spring clip assembled therein.
Figure 28:
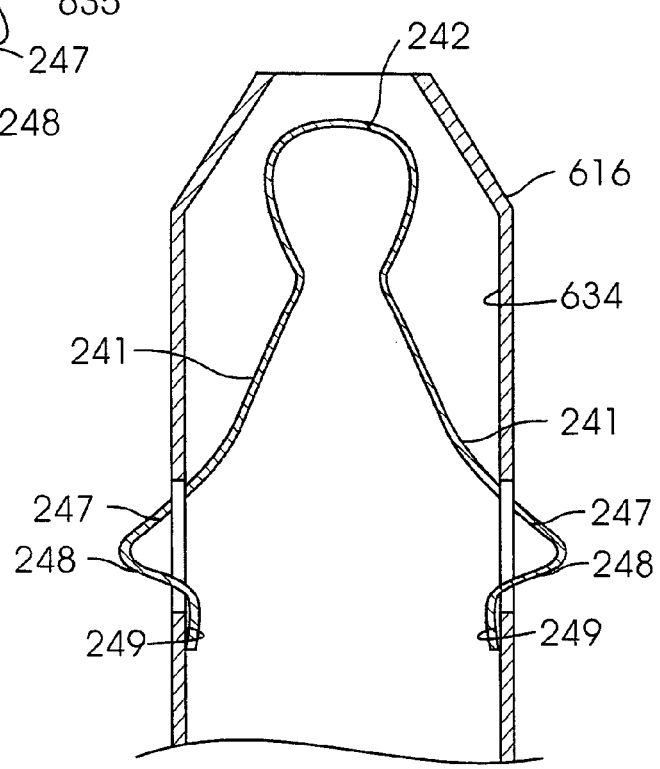
FIG. 28 is a cross-sectional view of the spring clip inside the picket having a narrow polygonal cross-section.
Figure 29:
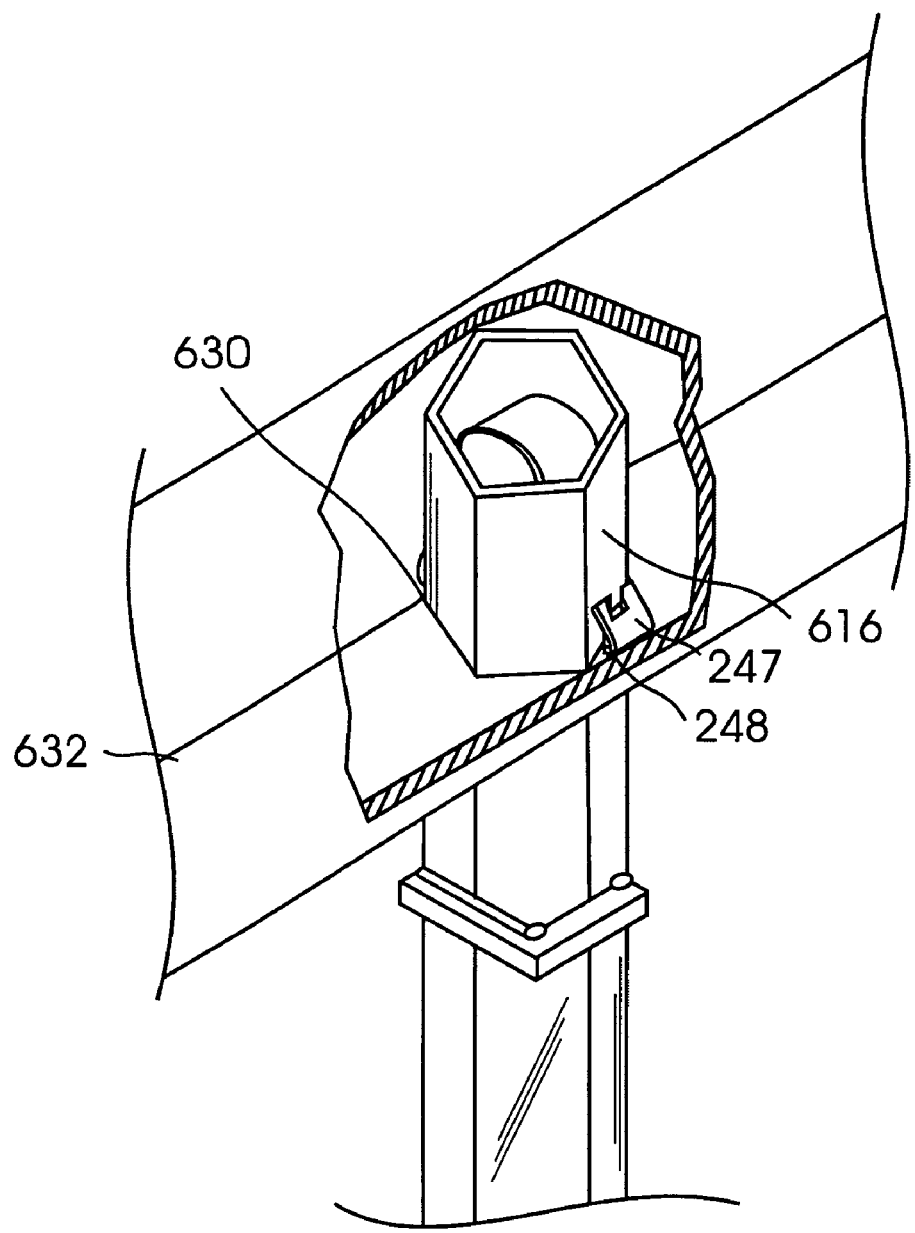
FIG. 29 is an open interior view of a horizontal rail of a fence with the picket having a narrow polygonal cross section with a spring clip assembled therein retained within the horizontal fence rail.

Referring to FIGS. 27 through 29, the present invention is utilized with a picket 616 have a narrow polygonal cross-section. The intent of the present application is to address any polygonal cross-sectional shape. For purposes of illustration, a hexagon is illustrated in FIGS. 27 through 32. However, it will be appreciated that the hexagonal shape is only one of many desired polygonal shapes which will be defined in general as a polygonal shape. For example, pentagonal, octagonal, etc. are also within the spirit and scope of the present invention and all polygonal shapes are collectively defined as polygonal for purposes of the present invention and claims. In addition, it is within the spirit and scope of the present invention to have a corresponding shape sealing cap for each specific cross-sectional shaped picket, such as sealing cap 24 in FIG. 2. The spring clip 240 may be made of metal or other suitable material with a memory to return to its pre-deformed shape after being compressed or squeezed. The spring clip 240 has a generally reversed U or V-shaped configuration with a bent middle portion 242 extending to a pair of side sections 241 each of which extend to a respective one of a pair of outwardly protruding stoppers 244. When the spring clip is inserted into the end portion of a picket having a narrow polygonal cross-section 616, the stoppers 244 will extend through the transverse apertures 634 of the picket 616.

Each stopper 244 has an opening 245 which receives a locking tongue 635 of a picket 616, thereby preventing movement of the spring clip 240 inside the picket 616.

Each stopper 244 of the spring clip 240 has an upper ramp side 247, a lower ramp side 248 and a transverse vertical tip 249. As the end portion of a picket 616 (with the spring clip 240 inserted) is inserted through a conforming narrow polygonal shaped aperture 630 in the lower surface 632 of a horizontal rail 618 of any cross-sectional configuration, the upper ramp side 247 of the spring clip 240 will engage the edges of the aperture 630 of the rail 618, first causing the spring clip 240 to be compressed, thereby allowing the end portion of the picket 616 to be inserted further through the aperture 630 in the horizontal rail 618. Once the upper ramp side 247 of the spring clip 240 passes the edges of the aperture 630 in the horizontal rail 618, the spring clip 240 will expand back, causing the vertical tip 249 of the spring clip 240 to be compressed against the interior wall 634 of the picket 616 while the lower ramp side 248 of the spring clip 240 will engage and rest upon the interior surface 632 of the hollow rail 618.

Once the stoppers 244 of the spring clip 240 snap in place inside the aperture 630 in the horizontal rail 618, the end portion of the picket 616 is locked therein and cannot be removed. The mechanism secures the picket 616 to the horizontal rail 618.

The modular fence and its components for this design are made from material selected from the group comprising steel, aluminum and vinyl.

Figure 30:
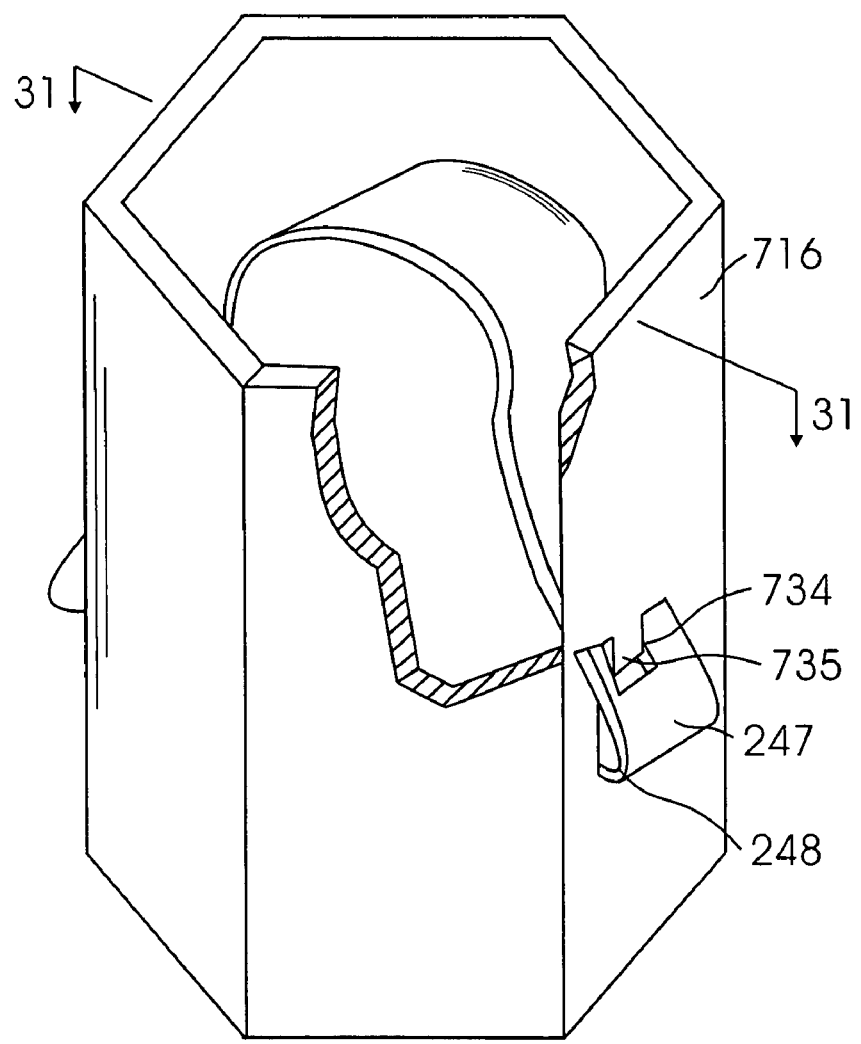
FIG. 30 is a partial perspective view of the top portion of the picket having a wide polygonal cross-section with a spring clip assembled therein.
Figure 31:
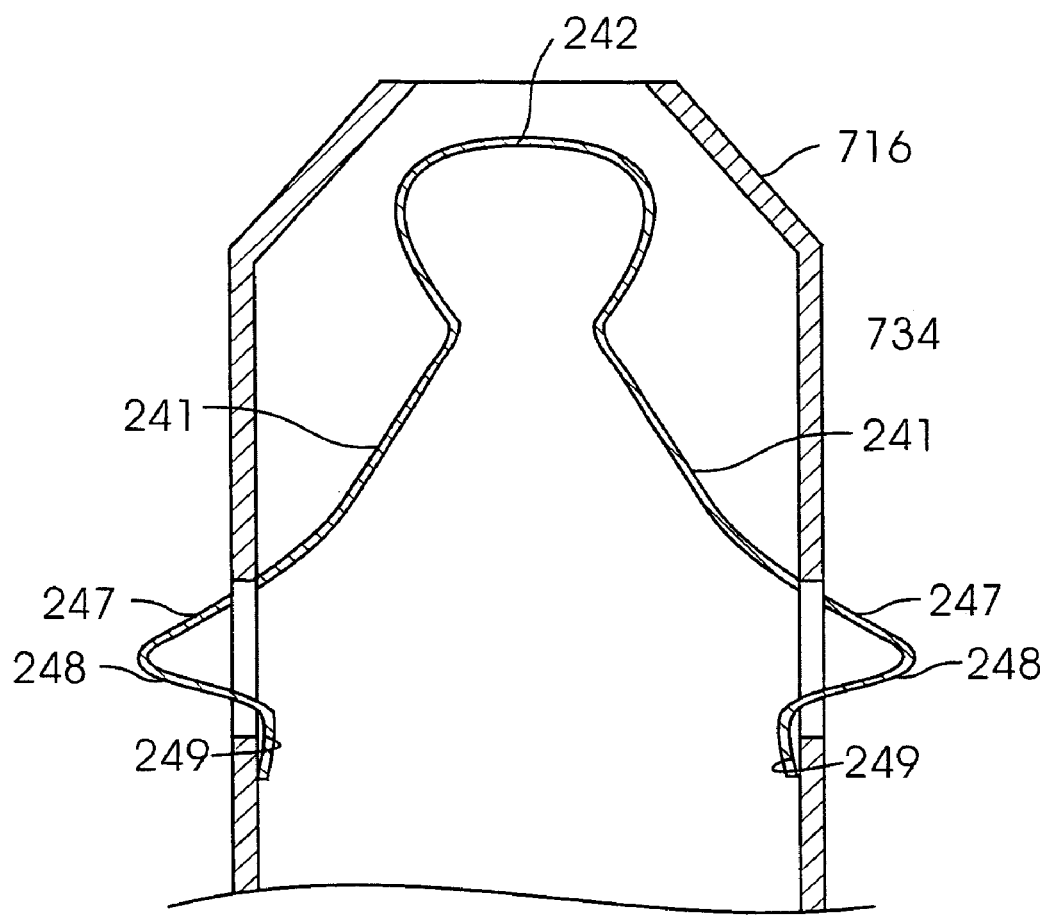
FIG. 31 is a cross-sectional view of the spring clip inside the picket having a wide polygonal cross-section.
Figure 32:
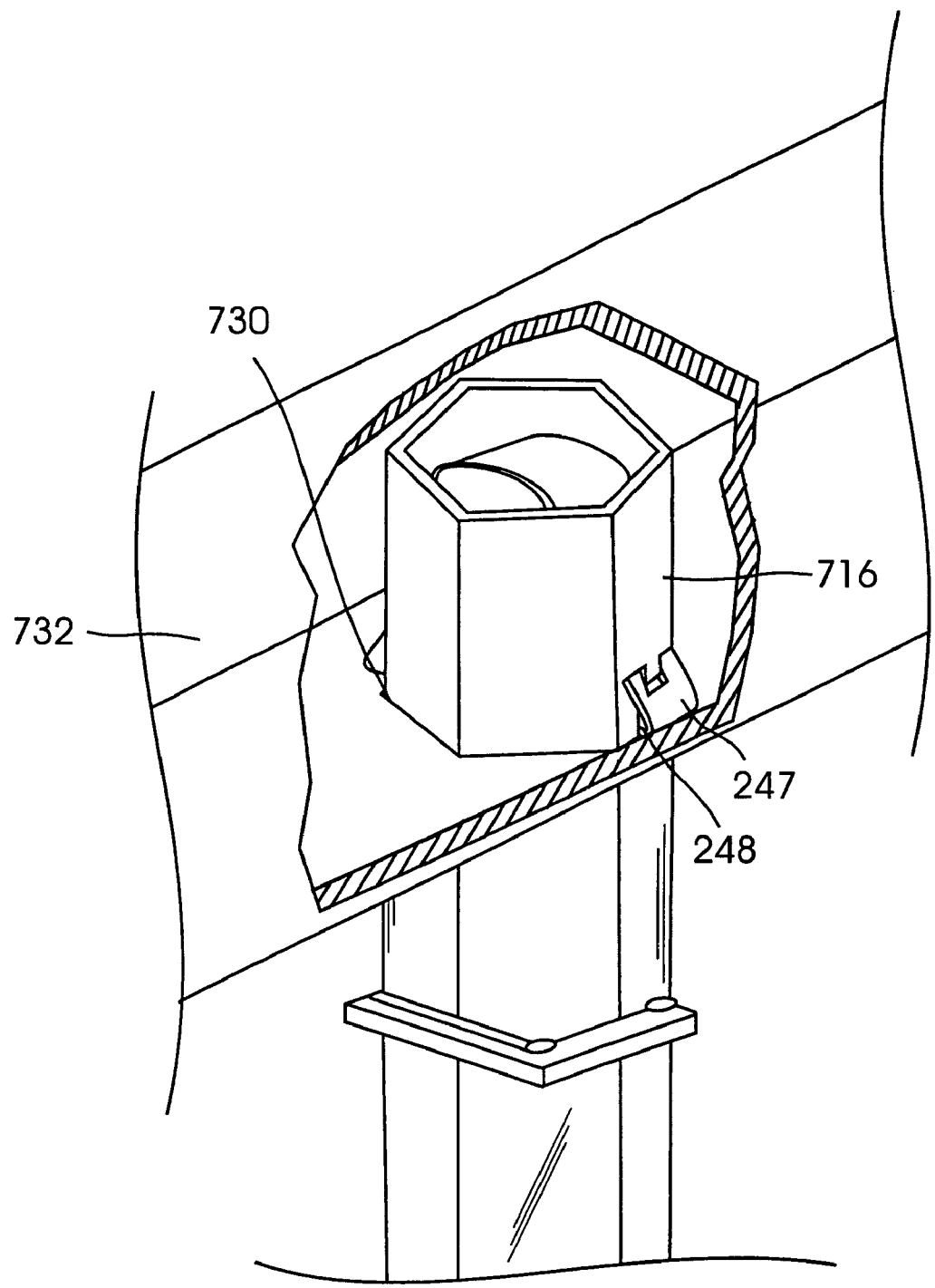
FIG. 32 is an open interior view of a horizontal rail of a fence with the picket having a wide polygonal cross section with a spring clip assembled therein retained within the horizontal fence rail.

Referring to FIGS. 30 through 32, the present invention is utilized with a picket 716 have a wide polygonal cross-section. The spring clip 240 may be made of metal or other suitable material with a memory to return to its pre-deformed shape after being compressed or squeezed. The spring clip 240 has a generally reversed U or V-shaped configuration with a bent middle portion 242 extending to a pair of side sections 241 each of which extend to a respective one of a pair of outwardly protruding stoppers 244. When the spring clip is inserted into the end portion of a picket having a wide polygonal cross-section 716, the stoppers 244 will extend through the transverse apertures 734 of the picket 16.

Each stopper 244: has an opening 245 which receives a locking tongue 735 of a picket 716, thereby preventing movement of the spring clip 240 inside the picket 716.

Each stopper 244 of the spring clip 240 has an upper ramp side 247, a lower ramp side 248 and a transverse vertical tip 249. As the end portion of a picket 716 (with the spring clip 240 inserted) is inserted through a conforming wide polygonal shaped aperture 730 in the lower surface 732 of a horizontal rail 718 of any cross-sectional configuration, the upper ramp side 247 of the spring clip 240 will engage the edges of the aperture 730 of the rail 718, first causing the spring clip 240 to be compressed, thereby allowing the end portion of the picket 716 to be inserted further through the aperture 730 in the horizontal rail 718. Once the upper ramp side 247 of the spring clip 240 passes the edges of the aperture 730 in the horizontal rail 718, the spring clip 240 will expand back, causing the vertical tip 249 of the spring clip 240 to be compressed against the interior wall 734 of the picket 716 while the lower ramp side 248 of the spring clip 240 will engage and rest upon the interior surface 732 of the hollow rail 718.

Once the stoppers 244 of the spring clip 240 snap in place inside the aperture 730 in the horizontal rail 718, the end portion of the picket 716 is locked therein and cannot be removed. The mechanism secures the picket 716 to the horizontal rail 718.

The modular fence and its components for this design are made from material selected from the group comprising steel, aluminum and vinyl.

Defined in detail, the present invention is a modular picket fence, comprising: (a) at least two spaced apart vertical posts being adaptable to be secured to a support surface; (b) at least two spaced apart upper and lower hollow horizontal rails each horizontal rail having an enclosed upper surface with a plurality of spaced apart square shaped apertures and an enclosed lower surface with a plurality of spaced apart square shaped apertures, a respective square shaped aperture in an upper surface aligned with a respective square shaped aperture in a lower surface; (c) means for attaching the at least two horizontal rails to the at least two vertical posts such that corresponding square shaped apertures on the at least two horizontal rails are aligned; (d) a plurality of spaced apart vertical pickets having a square shaped cross-section and having a hollow interior secured in mutually parallel relationship to the at least two horizontal rails, each the square shaped vertical picket having two opposite end portions respectively inserted into the aligned square shaped apertures of the at least two horizontal rails, each the end portion of each the square shaped vertical pickets having two oppositely disposed and aligned transverse apertures each aperture having a locking tongue extending into the aperture; (e) means for locking the each end portion of the each square shaped vertical picket to one of the at least two horizontal rails when the end portion is inserted into a respective aligned set of square shaped corresponding apertures of the respective one of the at least two horizontal rails, the locking means comprising a one-piece generally U-shaped spring clip having a bent middle portion and two opposite end portions each having an outwardly protruding stopper, each stopper having an upper ramp side having an opening which receives a corresponding locking tongue, a lower ramp side and a vertical transverse tip, the spring clip inserted into the each end portion of the each vertical picket with the opposite stoppers of the spring clip secured to the vertical picket by means of a locking tongue received within the opening in an upper ramp side and each upper and lower ramp side respectively protruding through the two oppositely disposed and aligned transverse apertures of each the end portion of each the vertical picket; and (f) the each end portion of each the vertical picket is inserted into one of the corresponding aligned sets of square shaped apertures of the respective one of the horizontal rails, the stoppers of the spring clip are inserted in the each end portion of each the square shaped vertical pickets and extend through the transverse apertures of the each end portion of each the square shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the square shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the square shaped vertical picket such that vertical movement of each the square shaped vertical picket relative to the respective one of the horizontal rails is prevented.

Defined alternatively, the present invention is a modular picket fence, comprising: (a) at least two spaced apart vertical posts adaptable to be secured to a support surface; (b) at least two spaced apart upper and lower hollow horizontal rails each horizontal rail having an enclosed upper surface with a plurality of spaced apart narrow rectangular shaped apertures and an enclosed lower surface with a plurality of spaced apart narrow rectangular shaped apertures, a respective narrow rectangular shaped aperture in an upper surface aligned with a respective narrow rectangular shaped aperture in a lower surface; (c) means for attaching the at least two horizontal rails to the at least two vertical posts such that corresponding narrow rectangular shaped apertures on the at least two horizontal rails are aligned; (d) a plurality of spaced apart vertical pickets having a narrow rectangular shaped cross-section and having a hollow interior secured in mutually parallel relationship to the at least two horizontal rails, each the narrow rectangular shaped vertical picket having two opposite end portions respectively inserted into the aligned narrow rectangular shaped apertures of the at least two horizontal rails, each the end portion of each the narrow rectangular shaped vertical pickets having two oppositely disposed and aligned transverse apertures each aperture having a locking tongue extending into the aperture; (e) means for locking the each end portion of the each narrow rectangular shaped vertical picket to one of the at least two horizontal rails when the end portion is inserted into a respective aligned set of narrow rectangular shaped corresponding apertures of the respective one of the at least two horizontal rails, the locking means comprising a one-piece generally U-shaped spring clip having a bent middle portion and two opposite end portions each having an outwardly protruding stopper, each stopper having an upper ramp side having an opening which receives a corresponding locking tongue, a lower ramp side and a vertical transverse tip, the spring clip inserted into the each end portion of the each vertical picket with the opposite stoppers of the spring clip secured to the vertical picket by means of a locking tongue received within the opening in an upper ramp side and each upper and lower ramp side respectively protruding through the two oppositely disposed and aligned transverse apertures of each the end portion of each the vertical picket; and (f) the each end portion of each the vertical picket is inserted into one of the corresponding aligned sets of narrow rectangular shaped apertures of the respective one of the horizontal rails, the stoppers of the spring clip are inserted in the each end portion of each the narrow rectangular shaped vertical pickets and extend through the transverse apertures of the each end portion of each the narrow rectangular shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the narrow rectangular shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the narrow rectangular shaped vertical picket such that vertical movement of each the narrow rectangular shaped vertical picket relative to the respective one of the horizontal rails is prevented.

Defined alternatively, the present invention is a modular picket fence, comprising: (a) at least two spaced apart vertical posts adaptable to be secured to a support surface; (b) at least two spaced apart upper and lower hollow horizontal rails each horizontal rail having an enclosed upper surface with a plurality of spaced apart wide rectangular shaped apertures and an enclosed lower surface with a plurality of spaced apart wide rectangular shaped apertures, a respective wide rectangular shaped aperture in an upper surface aligned with a respective wide rectangular shaped aperture in a lower surface; (c) means for attaching the at least two horizontal rails to the at least two vertical posts such that corresponding narrow rectangular shaped apertures on the at least two horizontal rails are aligned; (d) a plurality of spaced apart vertical pickets having a wide rectangular shaped cross-section and having a hollow interior secured in mutually parallel relationship to the at least two horizontal rails, each the wide rectangular shaped vertical picket having two opposite end portions respectively inserted into the aligned wide rectangular shaped apertures of the at least two horizontal rails, each the end portion of each the wide rectangular shaped vertical pickets having two oppositely disposed and aligned transverse apertures each aperture having a locking tongue extending into the aperture; (e) means for locking the each end portion of the each wide rectangular shaped vertical picket to one of the at least two horizontal rails when the end portion is inserted into a respective aligned set of wide rectangular shaped corresponding apertures of the respective one of the at least two horizontal rails, the locking means comprising a one-piece generally U-shaped spring clip having a bent middle portion and two opposite end portions each having an outwardly protruding stopper, each stopper having an upper ramp side having an opening which receives a corresponding locking tongue, a lower ramp side and a vertical transverse tip, the spring clip inserted into the each end portion of the each vertical picket with the opposite stoppers of the spring clip secured to the vertical picket by means of a locking tongue received within the opening in an upper ramp side and each upper and lower ramp side respectively protruding through the two oppositely disposed and aligned transverse apertures of each the end portion of each the vertical picket; and (f) the each end portion of each the vertical picket is inserted into one of the corresponding aligned sets of wide rectangular shaped apertures of the respective one of the horizontal rails, the stoppers of the spring clip are inserted in the each end portion of each the wide rectangular shaped vertical pickets and extend through the transverse apertures of the each end portion of each the wide rectangular shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the wide rectangular shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the wide rectangular shaped vertical picket such that vertical movement of each the wide rectangular shaped vertical picket relative to the respective one of the horizontal rails is prevented.

Defined alternatively, the present invention is a modular picket fence, comprising: (a) at least two spaced apart vertical posts adaptable to be secured to a support surface; (b) at least two spaced apart upper and lower hollow horizontal rails each horizontal rail having an enclosed upper surface with a plurality of spaced apart oval shaped apertures and an enclosed lower surface with a plurality of spaced apart oval shaped apertures, a respective oval shaped aperture in an upper surface aligned with a respective oval shaped aperture in a lower surface; (c) means for attaching the at least two horizontal rails to the at least two vertical posts such that corresponding oval shaped apertures on the at least two horizontal rails are aligned; (d) a plurality of spaced apart vertical pickets having an oval shaped cross-section and having a hollow interior secured in mutually parallel relationship to the at least two horizontal rails, each the oval shaped vertical picket having two opposite end portions respectively inserted into the aligned oval shaped apertures of the at least two horizontal rails, each the end portion of each the oval shaped vertical pickets having two oppositely disposed and aligned transverse apertures each aperture having a locking tongue extending into the aperture; (e) means for locking the each end portion of the each oval shaped vertical picket to one of the at least two horizontal rails when the end portion is inserted into a respective aligned set of oval shaped corresponding apertures of the respective one of the at least two horizontal rails, the locking means comprising a one-piece generally U-shaped spring clip having a bent middle portion and two opposite end portions each having an outwardly protruding stopper, each stopper having an upper ramp side having an opening which receives a corresponding locking tongue, a lower ramp side and a vertical transverse tip, the spring clip inserted into the each end portion of the each vertical picket with the opposite stoppers of the spring clip secured to the vertical picket by means of a locking tongue received within the opening in an upper ramp side and each upper and lower ramp side respectively protruding through the two oppositely disposed and aligned transverse apertures of each the end portion of each the vertical picket; and (f) the each end portion of each the vertical picket is inserted into one of the corresponding aligned sets of oval shaped apertures of the respective one of the horizontal rails, the stoppers of the spring clip are inserted in the each end portion of each the oval shaped vertical pickets and extend through the transverse apertures of the each end portion of each the oval shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the oval shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the oval shaped vertical picket such that vertical movement of each the oval shaped vertical picket relative to the respective one of the horizontal rails is prevented.

Defined alternatively, the present invention is a modular picket fence, comprising: (a) at least two spaced apart vertical posts adaptable to be secured to a support surface; (b) at least two spaced apart upper and lower hollow horizontal rails each horizontal rail having an enclosed upper surface with a plurality of spaced apart round shaped apertures and an enclosed lower surface with a plurality of spaced apart round shaped apertures, a respective round shaped aperture in an upper surface aligned with a respective round shaped aperture in a lower surface; (c) means for attaching the at least two horizontal rails to the at least two vertical posts such that corresponding round shaped apertures on the at least two horizontal rails are aligned; (d) a plurality of spaced apart vertical pickets having a round shaped cross-section and having a hollow interior secured in mutually parallel relationship to the at least two horizontal rails, each the round shaped vertical picket having two opposite end portions respectively inserted into the aligned round shaped apertures of the at least two horizontal rails, each the end portion of each the round shaped vertical pickets having two oppositely disposed and aligned transverse apertures each aperture having a locking tongue extending into the aperture; (e) means for locking the each end portion of the each round shaped vertical picket to one of the at least two horizontal rails when the end portion is inserted into a respective aligned set of round shaped corresponding apertures of the respective one of the at least two horizontal rails, the locking means comprising a one-piece generally U-shaped spring clip having a bent middle portion and two opposite end portions each having an outwardly protruding stopper, each stopper having an upper ramp side having an opening which receives a corresponding locking tongue, a lower ramp side and a vertical transverse tip, the spring clip inserted into the each end portion of the each vertical picket with the opposite stoppers of the spring clip secured to the vertical picket by means of a locking tongue received within the opening in an upper ramp side and each upper and lower ramp side respectively protruding through the two oppositely disposed and aligned transverse apertures of each the end portion of each the vertical picket; and (f) the each end portion of each the vertical picket is inserted into one of the corresponding aligned sets of round shaped apertures of the respective one of the horizontal rails, the stoppers of the spring clip are inserted in the each end portion of each the round shaped vertical pickets and extend through the transverse apertures of the each end portion of each the round shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the round shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the round shaped vertical picket such that vertical movement of each the round shaped vertical picket relative to the respective one of the horizontal rails is prevented.

Defined alternatively, the present invention is a modular picket fence, comprising: (a) at least two spaced apart vertical posts adaptable to be secured to a support surface; (b) at least two spaced apart upper and lower hollow horizontal rails each horizontal rail having an enclosed upper surface with a plurality of spaced apart narrow polygonal shaped apertures and an enclosed lower surface with a plurality of spaced apart narrow polygonal apertures, a respective narrow polygonal shaped aperture in an upper surface aligned with a respective narrow polygonal shaped aperture in a lower surface; (c) means for attaching the at least two horizontal rails to the at least two vertical posts such that corresponding narrow polygonal shaped apertures on the at least two horizontal rails are aligned; (d) a plurality of spaced apart vertical pickets having a narrow polygonal shaped cross-section and having a hollow interior secured in mutually parallel relationship to the at least two horizontal rails, each the narrow polygonal shaped vertical picket having two opposite end portions respectively inserted into the aligned narrow polygonal shaped apertures of the at least two horizontal rails, each the end portion of each the narrow polygonal shaped vertical pickets having two oppositely disposed and aligned transverse apertures each aperture having a locking tongue extending into the aperture; (e) means for locking the each end portion of the each narrow polygonal shaped vertical picket to one of the at least two horizontal rails when the end portion is inserted into a respective aligned set of narrow polygonal shaped corresponding apertures of the respective one of the at least two horizontal rails, the locking means comprising a one-piece generally U-shaped spring clip having a bent middle portion and two opposite end portions each having an outwardly protruding stopper, each stopper having an upper ramp side having an opening which receives a corresponding locking tongue, a lower ramp side and a vertical transverse tip, the spring clip inserted into the each end portion of the each vertical picket with the opposite stoppers of the spring clip secured to the vertical picket by means of a locking tongue received within the opening in an upper ramp side and each upper and lower ramp side respectively protruding through the two oppositely disposed and aligned transverse apertures of each the end portion of each the vertical picket; and (f) the each end portion of each the vertical picket is inserted into one of the corresponding aligned sets of narrow polygonal shaped apertures of the respective one of the horizontal rails, the stoppers of the spring clip are inserted in the each end portion of each the narrow polygonal shaped vertical pickets and extend through the transverse apertures of the each end portion of each the narrow polygonal shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the narrow polygonal shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the narrow polygonal vertical picket such that vertical movement of each the narrow polygonal shaped vertical picket relative to the respective one of the horizontal rails is prevented.

Defined alternatively, the present invention is a modular picket fence, comprising: (a) at least two spaced apart vertical posts adaptable to be secured to a support surface; (b) at least two spaced apart upper and lower hollow horizontal rails each horizontal rail having an enclosed upper surface with a plurality of spaced apart wide polygonal shaped apertures and an enclosed lower surface with a plurality of spaced apart wide polygonal apertures, a respective wide polygonal shaped aperture in an upper surface aligned with a respective wide polygonal shaped aperture in a lower surface; (c) means for attaching the at least two horizontal rails to the at least two vertical posts such that corresponding wide polygonal shaped apertures on the at least two horizontal rails are aligned; (d) a plurality of spaced apart vertical pickets having a wide polygonal shaped cross-section and having a hollow interior secured in mutually parallel relationship to the at least two horizontal rails, each the wide polygonal shaped vertical picket having two opposite end portions respectively inserted into the aligned wide polygonal shaped apertures of the at least two horizontal rails, each the end portion of each the wide polygonal shaped vertical pickets having two oppositely disposed and aligned transverse apertures each aperture having a locking tongue extending into the aperture; (e) means for locking the each end portion of the each wide polygonal shaped vertical picket to one of the at least two horizontal rails when the end portion is inserted into a respective aligned set of wide polygonal shaped corresponding apertures of the respective one of the at least two horizontal rails, the locking means comprising a one-piece generally U-shaped spring clip having a bent middle portion and two opposite end portions each having an outwardly protruding stopper, each stopper having an upper ramp side having an opening which receives a corresponding locking tongue, a lower ramp side and a vertical transverse tip, the spring clip inserted into the each end portion of the each vertical picket with the opposite stoppers of the spring clip secured to the vertical picket by means of a locking tongue received within the opening in an upper ramp side and each upper and lower ramp side respectively protruding through the two oppositely disposed and aligned transverse apertures of each the end portion of each the vertical picket; and (f) the each end portion of each the vertical picket is inserted into one of the corresponding aligned sets of wide polygonal shaped apertures of the respective one of the horizontal rails, the stoppers of the spring clip are inserted in the each end portion of each the wide polygonal shaped vertical pickets and extend through the transverse apertures of the each end portion of each the wide polygonal shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the wide polygonal shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the narrow polygonal vertical picket such that vertical movement of each the wide polygonal shaped vertical picket relative to the respective one of the horizontal rails is prevented.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A modular picket fence, comprising:
   a. at least two spaced apart vertical posts being adaptable to be secured to a support surface;
   b. at least two spaced apart upper and lower hollow horizontal rails each horizontal rail having an enclosed upper surface with a plurality of spaced apart square shaped apertures and an enclosed lower surface with a plurality of spaced apart square shaped apertures, a respective square shaped aperture in an upper surface aligned with a respective square shaped aperture in a lower surface;
   c. means for attaching said at least two horizontal rails to said at least two vertical posts such that corresponding square shaped apertures on said at least two horizontal rails are aligned;
   d. a plurality of spaced apart vertical pickets having a square shaped cross-section and having a hollow interior and respectively secured in mutually parallel relationship to said at least two horizontal rails, each said square shaped vertical picket having two opposite end portions respectively inserted into said aligned square shaped apertures of said at least two horizontal rails, each said end portion of each said square shaped vertical pickets having two oppositely disposed and aligned transverse apertures, each aperture having a locking tongue extending into the aperture;
   e. means for locking said each end portion of said each square shaped vertical picket to one of said at least two horizontal rails when said end portion is inserted into a respective aligned set of square shaped corresponding apertures of said respective one of said at least two horizontal rails, said locking means each comprising a one-piece generally U-shaped spring clip having a bent middle portion and two opposite end portions each having an outwardly protruding stopper, each stopper having an upper ramp side having an opening which receives the locking tongue, a lower ramp side and a vertical transverse tip, each said spring clip respectively inserted into said each end portion of said each vertical picket with said opposite stoppers of said spring clip secured to the vertical picket by the locking tongue received within the opening in the upper ramp side, and each upper and lower ramp side respectively protruding through said two oppositely disposed and aligned transverse apertures of each said end portion of each said vertical picket; and f. wherein when said each end portion of each said vertical picket is inserted into one of said corresponding aligned sets of square shaped apertures of said respective one of said horizontal rails, said stoppers of said spring clip are inserted in said each end portion of each said square shaped vertical pickets and extend through said transverse apertures of said each end portion of each said square shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the square shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the square shaped vertical picket such that vertical movement of each said square shaped vertical picket relative to said respective one of said horizontal rails is prevented.

2. The modular picket fence in accordance with claim 1, further comprising a sealing cap for covering each spaced apart square shaped apertures of said horizontal rails after said fence is assembled.

3. The modular picket fence in accordance with claim 1, wherein said attaching means includes bolts and nuts.

4. The modular picket fence in accordance with claim 1, wherein the modular picket fence and its components are made from material selected from the group consisting of steel, aluminum and vinyl.

5. A modular picket fence, comprising:

a. at least two spaced apart vertical posts adaptable to be secured to a support surface;

b. at least two spaced apart upper and lower hollow horizontal rails each horizontal rail having an enclosed upper surface with a plurality of spaced apart narrow rectangular shaped apertures and an enclosed lower surface with a plurality of spaced apart narrow rectangular shaped apertures, a respective narrow rectangular shaped aperture in an upper surface aligned with a respective narrow rectangular shaped aperture in a lower surface;

c. means for attaching said at least two horizontal rails to said at least two vertical posts such that corresponding narrow rectangular shaped apertures on said at least two horizontal rails are aligned;

d. a plurality of spaced apart vertical pickets having a narrow rectangular shaped cross-section and having a hollow interior and respectively secured in mutually parallel relationship to said at least two horizontal rails, each said narrow rectangular shaped vertical picket having two opposite end portions respectively inserted into said aligned narrow rectangular shaped apertures of said at least two horizontal rails, each said end portion of each said narrow rectangular shaped vertical pickets having two oppositely disposed and aligned transverse apertures, each aperture having a locking tongue extending into the aperture;

e. means for locking said each end portion of each said narrow rectangular shaped vertical picket to one of said at least two horizontal rails when said end portion is inserted into a respective aligned set of narrow rectangular shaped corresponding apertures of said respective one of said at least two horizontal rails, said locking means each comprising a one-piece generally U-shaped spring clip having a bent middle portion and two opposite end portions each having an outwardly protruding stopper, each stopper having an upper ramp side having an opening which receives the locking tongue, a lower ramp side and a vertical transverse tip, each said spring clip respectively inserted into said each end portion of said each vertical picket with said opposite stoppers of said spring clip secured to the vertical picket by the locking tongue received within the opening in the upper ramp side, and each upper and lower ramp side respectively protruding through said two oppositely disposed and aligned transverse apertures of each said end portion of each said vertical picket; and f. wherein when said each end portion of each said vertical picket is inserted into one of said corresponding aligned sets of narrow rectangular shaped apertures of said respective one of said horizontal rails, said stoppers of said spring clip are inserted in said each end portion of each said narrow rectangular shaped vertical pickets and extend through said transverse apertures of said each end portion of each said narrow rectangular shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the narrow rectangular shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the narrow rectangular shaped vertical picket such that vertical movement of each said narrow rectangular shaped vertical picket relative to said respective one of said horizontal rails is prevented.

6. The modular picket fence in accordance with claim 5, further comprising a sealing cap for covering each spaced apart narrow rectangular shaped apertures of said horizontal rails after said fence is assembled.

7. The modular picket fence in accordance with claim 5, wherein said attaching means includes bolts and nuts.

8. The modular picket fence in accordance with claim 5, wherein the modular picket fence and its components are made from material selected from the group consisting of steel, aluminum and vinyl.

9. A modular picket fence, comprising:

a. at least two spaced apart vertical posts adaptable to be secured to a support surface;

b. at least two spaced apart upper and lower hollow horizontal rails each horizontal rail having an enclosed upper surface with a plurality of spaced apart wide rectangular shaped apertures and an enclosed lower surface with a plurality of spaced apart wide rectangular shaped apertures, a respective wide rectangular shaped aperture in an upper surface aligned with a respective wide rectangular shaped aperture in a lower surface;

c. means for attaching said at least two horizontal rails to said at least two vertical posts such that corresponding narrow rectangular shaped apertures on said at least two horizontal rails are aligned;

d. a plurality of spaced apart vertical pickets having a wide rectangular shaped cross-section and having a hollow interior and respectively secured in mutually parallel relationship to said at least two horizontal rails, each said wide rectangular shaped vertical picket having two opposite end portions respectively inserted into said aligned wide rectangular shaped apertures of said at least two horizontal rails, each said end portion of each said wide rectangular shaped vertical pickets having two oppositely disposed and aligned transverse apertures, each aperture having a locking tongue extending into the aperture;

e. means for locking said each end portion of said each wide rectangular shaped vertical picket to one of said at least two horizontal rails when said end portion is inserted into a respective aligned set of wide rectangular shaped corresponding apertures of said respective one of said at least two horizontal rails, said locking means each comprising a one-piece generally U-shaped spring clip having a bent middle portion and two opposite end portions each having an outwardly protruding stopper, each stopper having an upper ramp side having an opening which receives the locking tongue, a lower ramp side and a vertical transverse tip, each said spring clip respectively inserted into said each end portion of said each vertical picket with said opposite stoppers of said spring clip secured to the vertical picket by the locking tongue received within the opening in the upper ramp side, and each upper and lower ramp side respectively protruding through said two oppositely disposed and aligned transverse apertures of each said end portion of each said vertical picket; and f. wherein when said each end portion of each said vertical picket is inserted into one of said corresponding aligned sets of wide rectangular shaped apertures of said respective one of said horizontal rails, said stoppers of said spring clip are inserted in said each end portion of each said wide rectangular shaped vertical pickets and extend through said transverse apertures of said each end portion of each said wide rectangular shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the wide rectangular shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the wide rectangular shaped vertical picket such that vertical movement of each said wide rectangular shaped vertical picket relative to said respective one of said horizontal rails is prevented.

10. The modular picket fence in accordance with claim 9, further comprising a sealing cap for covering each spaced apart wide rectangular shaped apertures of said horizontal rails after said fence is assembled.

11. The modular picket fence in accordance with claim 9, wherein said attaching means includes bolts and nuts.

12. The modular picket fence in accordance with claim 9, wherein the modular picket fence and its components are made from material selected from the group consisting of steel, aluminum and vinyl.

13. A modular picket fence, comprising:

a. at least two spaced apart vertical posts adaptable to be secured to a support surface;

b. at least two spaced apart upper and lower hollow horizontal rails each horizontal rail having an enclosed upper surface with a plurality of spaced apart oval shaped apertures and an enclosed lower surface with a plurality of spaced apart oval shaped apertures, a respective oval shaped aperture in an upper surface aligned with a respective oval shaped aperture in a lower surface;

c. means for attaching said at least two horizontal rails to said at least two vertical posts such that corresponding oval shaped apertures on said at least two horizontal rails are aligned;

d. a plurality of spaced apart vertical pickets having an oval shaped cross-section and having a hollow interior and respectively secured in mutually parallel relationship to said at least two horizontal rails, each said oval shaped vertical picket having two opposite end portions respectively inserted into said aligned oval shaped apertures of said at least two horizontal rails, each said end portion of each said oval shaped vertical pickets having two oppositely disposed and aligned transverse apertures, each aperture having a locking tongue extending into the aperture;

e. means for locking said each end portion of said each oval shaped vertical picket to one of said at least two horizontal rails when said end portion is inserted into a respective aligned set of oval shaped corresponding apertures of said respective one of said at least two horizontal rails, said locking means each comprising a one-piece generally U-shaped spring clip having a bent middle portion and two opposite end portions each having an outwardly protruding stopper, each stopper having an upper ramp side having an opening which receives the locking tongue, a lower ramp side and a vertical transverse tip, each said spring clip respectively inserted into said each end portion of said each vertical picket with said opposite stoppers of said spring clip secured to the vertical picket by the locking tongue received within the opening in the upper ramp side and each upper and lower ramp side respectively protruding through said two oppositely disposed and aligned transverse apertures of each said end portion of each said vertical picket; and f. wherein when said each end portion of each said vertical picket is inserted into one of said corresponding aligned sets of oval shaped apertures of said respective one of said horizontal rails, said stoppers of said spring clip are inserted in said each end portion of each said oval shaped vertical pickets and extend through said transverse apertures of said each end portion of each said oval shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the oval shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the oval shaped vertical picket such that vertical movement of each said oval shaped vertical picket relative to said respective one of said horizontal rails is prevented.

14. The modular picket fence in accordance with claim 13, further comprising a sealing cap for covering each spaced apart oval shaped apertures of said horizontal rails after said fence is assembled.

15. The modular picket fence in accordance with claim 13, wherein said attaching means includes bolts and nuts.

16. The modular picket fence in accordance with claim 13, wherein the modular picket fence and its components are made from material selected from the group consisting of steel, aluminum and vinyl.

17. A modular picket fence, comprising:
a. at least two spaced apart vertical posts adaptable to be secured to a support surface;
b. at least two spaced apart upper and lower hollow horizontal rails each horizontal rail having an enclosed upper surface with a plurality of spaced apart round shaped apertures and an enclosed lower surface with a plurality of spaced apart round shaped apertures, a respective round shaped aperture in an upper surface aligned with a respective round shaped aperture in a lower surface;
c. means for attaching said at least two horizontal rails to said at least two vertical posts such that corresponding round shaped apertures on said at least two horizontal rails are aligned;
d. a plurality of spaced apart vertical pickets having a round shaped cross-section and having a hollow interior and respectively secured in mutually parallel relationship to said at least two horizontal rails, each said round shaped vertical picket having two opposite end portions respectively inserted into said aligned round shaped apertures of said at least two horizontal rails, each said end portion of each said round shaped vertical pickets having two oppositely disposed and aligned transverse apertures, each aperture having a locking tongue extending into the aperture;
e. means for locking said each end portion of said each round shaped vertical picket to one of said at least two horizontal rails when said end portion is inserted into a respective aligned set of round shaped corresponding apertures of said respective one of said at least two horizontal rails, said locking means each comprising a one-piece generally U-shaped spring clip having a bent middle portion and two opposite end portions each having an outwardly protruding stopper, each stopper having an upper ramp side having an opening which receives the locking tongue, a lower ramp side and a vertical transverse tip, each said spring clip respectively inserted into said each end portion of said each vertical picket with said opposite stoppers of said spring clip secured to the vertical picket by the locking tongue received within the opening in the ramp side, and each upper and lower ramp side respectively protruding through said two oppositely disposed and aligned transverse apertures of each said end portion of each said vertical picket; and
f. wherein when said each end portion of each said vertical picket is inserted into one of said corresponding aligned sets of round shaped apertures of said respective one of said horizontal rails, said stoppers of said spring clip are inserted in said each end portion of each said round shaped vertical pickets and extend through said transverse apertures of said each end portion of each said round shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the round shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the round shaped vertical picket such that vertical movement of each said round shaped vertical picket relative to said respective one of said horizontal rails is prevented.

18. The modular picket fence in accordance with claim 17, further comprising a sealing cap for covering each spaced apart round shaped apertures of said horizontal rails after said fence is assembled.

19. The modular picket fence in accordance with claim 17, wherein said attaching means includes bolts and nuts.

20. The modular picket fence in accordance with claim 17, wherein the modular picket fence and its components are made from material selected from the group consisting of steel, aluminum and vinyl.

21. A modular picket fence, comprising:
a. at least two spaced apart vertical posts adaptable to be secured to a support surface;
b. at least two spaced apart upper and lower hollow horizontal rails each horizontal rail having an enclosed upper surface with a plurality of spaced apart narrow polygonal shaped apertures and an enclosed lower surface with a plurality of spaced apart narrow polygonal apertures, a respective narrow polygonal shaped aperture in an upper surface aligned with a respective narrow polygonal shaped aperture in a lower surface;
c. means for attaching said at least two horizontal rails to said at least two vertical posts such that corresponding narrow polygonal shaped apertures on said at least two horizontal rails are aligned;
d. a plurality of spaced apart vertical pickets having a narrow polygonal shaped cross-section and having a hollow interior and respectively secured mutually parallel relationship to said at least two horizontal rails, each said narrow polygonal shaped vertical picket having two opposite end portions respectively inserted into said aligned narrow polygonal shaped apertures of said at least two horizontal rails, each said end portion of each said narrow polygonal shaped vertical pickets having two oppositely disposed and aligned transverse apertures, each aperture having a locking tongue extending into the aperture;
e. means for locking said each end portion of said each narrow polygonal shaped vertical picket to one of said at least two horizontal rails when said end portion is inserted into a respective aligned set of narrow polygonal shaped corresponding apertures of said respective one of said at least two horizontal rails, said locking means each comprising a one-piece generally U-shaped spring clip having a bent middle portion and two opposite end portions each having an outwardly protruding stopper, each stopper having an upper ramp side having an opening which receives a the locking tongue, a lower ramp side and a vertical transverse tip, each said spring clip respectively inserted into said each end portion of said each vertical picket with said opposite stoppers of said spring clip secured to the vertical picket by the locking tongue received within the opening in the upper ramp side, and each upper and lower ramp side respectively protruding through said two oppositely disposed and aligned transverse apertures of each said end portion of each said vertical picket; and f. wherein when said each end portion of each said vertical picket is inserted into one of said corresponding aligned sets of narrow polygonal shaped apertures of said respective one of said horizontal rails, said stoppers of said spring clip are inserted in said each end portion of each said narrow polygonal shaped vertical pickets and extend through said transverse apertures of said each end portion of each said narrow polygonal shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the narrow polygonal shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the narrow polygonal vertical picket such that vertical movement of each said narrow polygonal shaped vertical picket relative to said respective one of said horizontal rails is prevented.

22. The modular picket fence in accordance with claim 21, further comprising a sealing cap for covering each spaced apart narrow polygonal shaped apertures of said horizontal rails after said fence is assembled.

23. The modular picket fence in accordance with claim 21, wherein said attaching means includes bolts and nuts.

24. The modular picket fence in accordance with claim 21, wherein the modular picket fence and its components are made from material selected from the group consisting of steel, aluminum and vinyl.

25. A modular picket fence, comprising:

a. at least two spaced apart vertical posts adaptable to be secured to a support surface;

b. at least two spaced apart upper and lower hollow horizontal rails each horizontal rail having an enclosed upper surface with a plurality of spaced apart wide polygonal shaped apertures and an enclosed lower surface with a plurality of spaced apart wide polygonal apertures, a respective wide polygonal shaped aperture in an upper surface aligned with a respective wide polygonal shaped aperture in a lower surface;

c. means for attaching said at least two horizontal rails to said at least two vertical posts such that corresponding wide polygonal shaped apertures on said at least two horizontal rails are aligned;

d. a plurality of spaced apart vertical pickets having a wide polygonal shaped cross-section and having a hollow interior and respectively secured in mutually parallel relationship to said at least two horizontal rails, each said wide polygonal shaped vertical picket having two opposite end portions respectively inserted into said aligned wide polygonal shaped apertures of said at least two horizontal rails, each said end portion of each said wide polygonal shaped vertical pickets having two oppositely disposed and aligned transverse apertures, each aperture having a locking tongue extending into the aperture;

e. means for locking said each end portion of said each wide polygonal shaped vertical picket to one of said at least two horizontal rails when said end portion is inserted into a respective aligned set of wide polygonal shaped corresponding apertures of said respective one of said at least two horizontal rails, said locking means each comprising a one-piece generally U-shaped spring clip having a bent middle portion and two opposite end portions each having an outwardly protruding stopper, each stopper having an upper ramp side having an opening which receives the locking tongue, a lower ramp side and a vertical transverse tip, each said spring clip respectively inserted into said each end portion of said each vertical picket with said opposite stoppers of said spring clip secured to the vertical picket by the locking tongue received within the opening in the upper ramp side, and each upper and lower ramp side respectively protruding through said two oppositely disposed and aligned transverse apertures of each said end portion of each said vertical picket; and f. wherein when said each end portion of each said vertical picket is inserted into one of said corresponding aligned sets of wide polygonal shaped apertures of said respective one of said horizontal rails, said stoppers of said spring clip are inserted in said each end portion of each said wide polygonal shaped vertical pickets and extend through said transverse apertures of said each end portion of each said wide polygonal shaped vertical pickets such that for the upper horizontal rail the locking tongue engages the opening in the upper ramp side of the stopper so that the lower ramp side of the stopper rests upon the interior of the lower surface of the horizontal rail and the transverse vertical tip is compressed against the interior wall of the wide polygonal shaped vertical picket and for the lower horizontal rail the locking tongue engages the opening in the upper ramp side of the stopper so that the lower ramp side of the stopper rests underneath the interior of the upper surface of the horizontal rail and the transverse vertical tip is compressed against the interior wall of the narrow polygonal vertical picket such that vertical movement of each said wide polygonal shaped vertical picket relative to said respective one of said horizontal rails is prevented.

26. The modular picket fence in accordance with claim 25, further comprising a sealing cap for covering each spaced apart wide polygonal shaped apertures of said horizontal rails after said fence is assembled.

27. The modular picket fence in accordance with claim 25, wherein said attaching means includes bolts and nuts.

28. The modular picket fence in accordance with claim 25, wherein the modular picket fence and its components are made from material selected from the group consisting of steel, aluminum and vinyl.

* * * * *